United States Patent
Abe et al.

(10) Patent No.: US 12,448,637 B2
(45) Date of Patent: Oct. 21, 2025

(54) PRIMER, DEVICE FOR PRODUCING DOUBLE-STRANDED DNA USING PRIMER, AND METHOD FOR PRODUCING DOUBLE-STRANDED DNA USING PRIMER

(71) Applicant: Japan Science and Technology Agency, Kawaguchi (JP)

(72) Inventors: Hiroshi Abe, Nagoya (JP); Naoko Abe, Nagoya (JP); Kosuke Nakamoto, Nagoya (JP); Hiroki Murase, Nagoya (JP); Yasuaki Kimura, Nagoya (JP)

(73) Assignee: Japan Science and Technology Agency, Kawaguchi (JP)

( * ) Notice: Subject to any disclaimer, the term of this patent is extended or adjusted under 35 U.S.C. 154(b) by 939 days.

(21) Appl. No.: 17/631,407

(22) PCT Filed: Jul. 31, 2020

(86) PCT No.: PCT/JP2020/029442
§ 371 (c)(1),
(2) Date: Jan. 28, 2022

(87) PCT Pub. No.: WO2021/020562
PCT Pub. Date: Feb. 4, 2021

(65) Prior Publication Data
US 2022/0282294 A1   Sep. 8, 2022

(30) Foreign Application Priority Data
Jul. 31, 2019 (JP) ................. 2019-140852

(51) Int. Cl.
C12P 19/34 (2006.01)
C07H 19/10 (2006.01)
C07H 19/20 (2006.01)

(52) U.S. Cl.
CPC .............. *C12P 19/34* (2013.01); *C07H 19/10* (2013.01); *C07H 19/20* (2013.01)

(58) Field of Classification Search
CPC ....... C12Q 1/6876; C12P 19/34; C07H 19/10; C07H 19/20
See application file for complete search history.

(56) References Cited

U.S. PATENT DOCUMENTS

2011/0009607 A1   1/2011   Komiyama et al.

FOREIGN PATENT DOCUMENTS

EP   2270142 A1   1/2011
WO   2009113709 A1   9/2009
(Continued)

OTHER PUBLICATIONS

Dantzman et al., "Reactivity of a 2'-Thio Nucleotide Analog", J. Am. Chem. Soc, 1996, p. 11715-11719, vol. 118.
(Continued)

*Primary Examiner* — Jezia Riley
(74) *Attorney, Agent, or Firm* — The Webb Law Firm

(57) ABSTRACT

A primer for amplifying a nucleic acid having a structure represented by the formula (1):

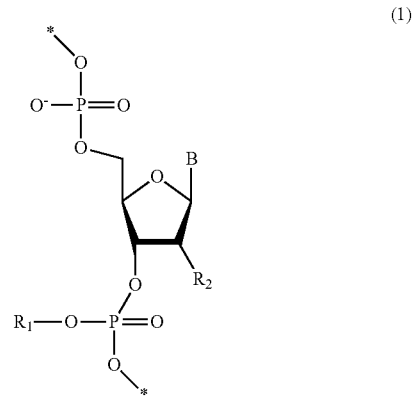

where B represents a base, $R_1$ represents a decomposable protecting group, and $R_2$ represents hydrogen or a hydroxyl group, and the symbol * represents a bond to a sugar of an adjacent nucleotide. A device for producing double-stranded DNA, includes: a forward primer and a reverse primer, having a structure represented by formula (1); a PCR device for forming double-stranded DNA with 3'-recessed ends by performing multiple cycles of PCR by using a template (Continued)

DNA as a template; and a photoirradiation unit for deprotecting $R_1$ and forming a sticky end with a 3'-protruding end.

9 Claims, 12 Drawing Sheets

Specification includes a Sequence Listing.

(56) References Cited

FOREIGN PATENT DOCUMENTS

| WO | 2015125845 A1 | 8/2015 |
|---|---|---|
| WO | 2019172394 A1 | 9/2019 |

OTHER PUBLICATIONS

Hamm et al., "Synthesis and Characterization of Oligonucleotides Containing 2'-S,3'-O-Cyclic Phosphorothiolate Termini", J. Org. Chem, 1999, p. 5700-5704, vol. 64.

Maier et al., "Nucleotides: New Types of Fluorescence Labeling of 2'Deoxycytidine", Helvetica Chimica Acta, 2009, p. 2722-2736, vol. 92.

Murase et al., "Development of new DNA assembly method for genome synthesis", The Chemical Society of Japan, 2020, 2 pages, English-language Abstract.

Ozaki et al., "Post-synthetic functionalization of oligodeoxyribonucleotides at the 2'-position", Tetrahedron Letters, 2001, p. 677-680, vol. 42.

Saneyoshi et al., "Synthesis and Characterization of Cell-Permeable Oligonucleotides Bearing Reduction-Activated Protecting Groups on the Internucleotide Linkages", Bioconjugate Chemistry, 2016, p. 2149-2156, vol. 72.

Wu et al., "Synthesis of Site-Specifically Phosphate-Caged siRNAs and Evaluation of Their RNAi Activity and Stability", Chem. Eur J., 2014, p. 12114-12122, vol. 20.

Höbartner et al., "Chemical Synthesis of Selenium-Modified Oligoribonucleotides and Their Enzymatic Ligation Leading to an U6 SnRNA Stem-Loop Segment", Journal of the American Chemical Society, Jan. 9, 2004, pp. 1141-1149, vol. 126.

Jud et al., "Expanding the Scope of 2'-SCF3 Modified RNA", Chem. Eur. J., 2015, pp. 10400-10407, vol. 21.

Saneyoshi et al., "synthesis and Characterization of Cell-Permeable Olignucleotides Bearing Reduction-Activated Protecting Groups on the Internucleotide Linkages" Bioconjugate Chemistry, 2016, pp. 2149-2156, vol. 27, No. 9.

[FIG. 1]
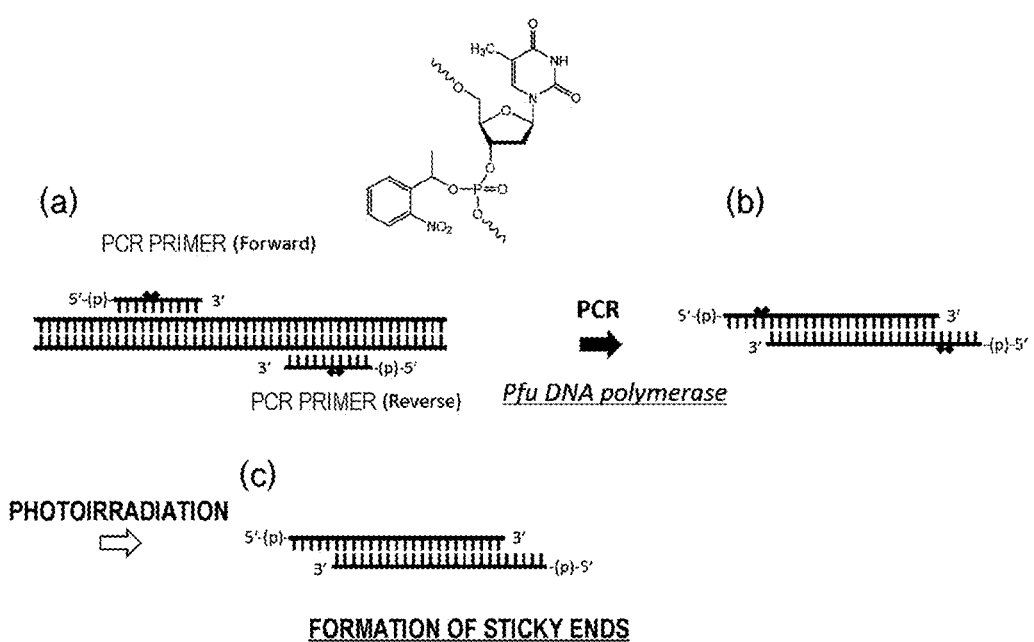

[FIG. 2]
(a) BEFORE PURIFICATION
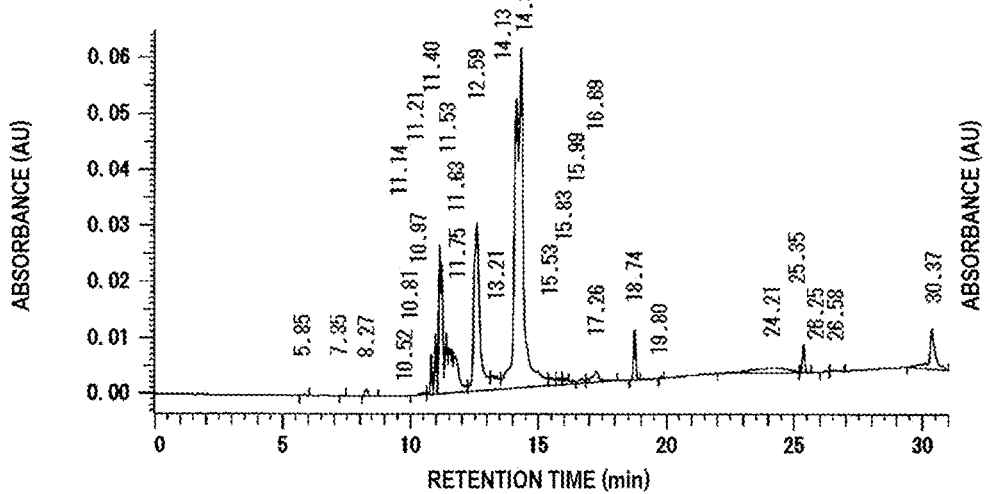
(b) AFTER PURIFICATION
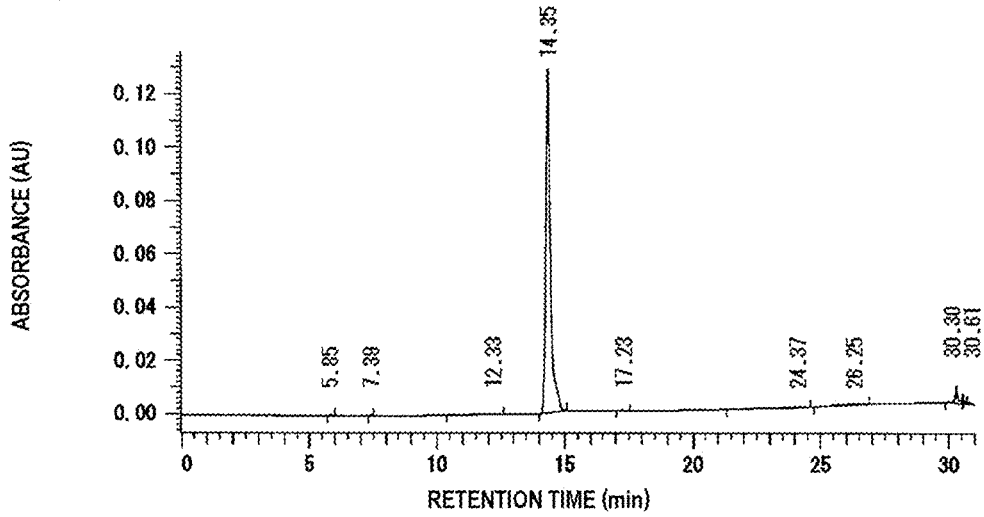

[FIG. 3]
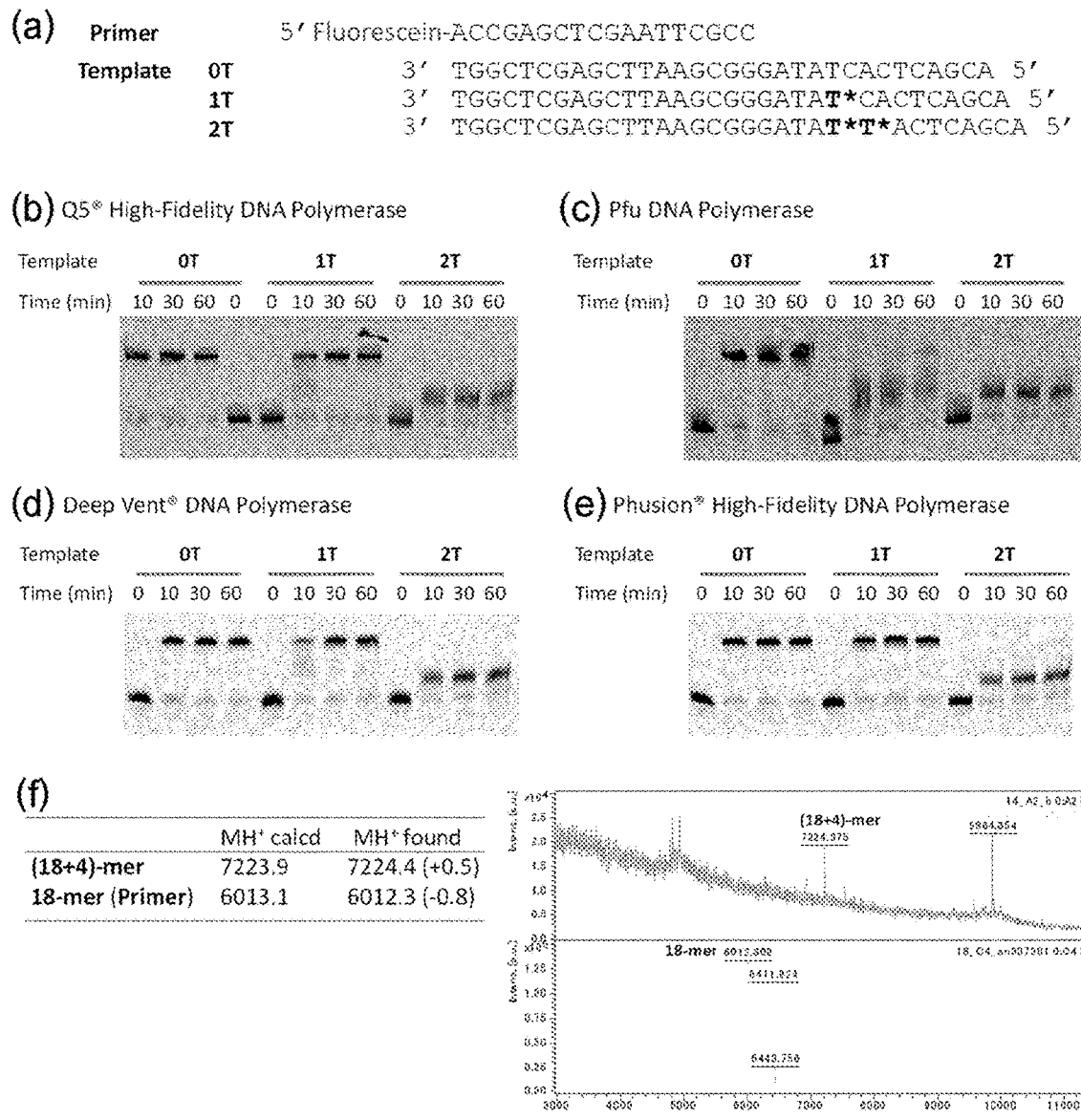

[FIG. 4]
(a)
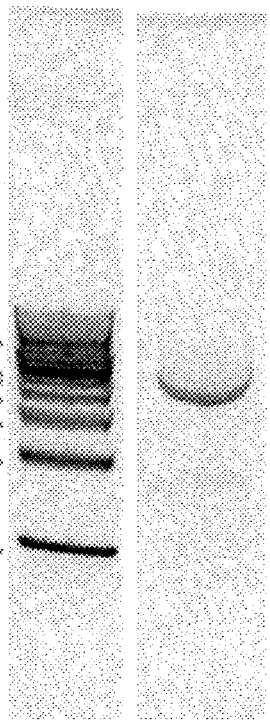
(b)
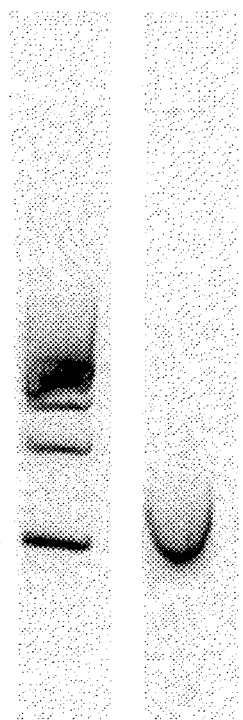

[FIG. 5]
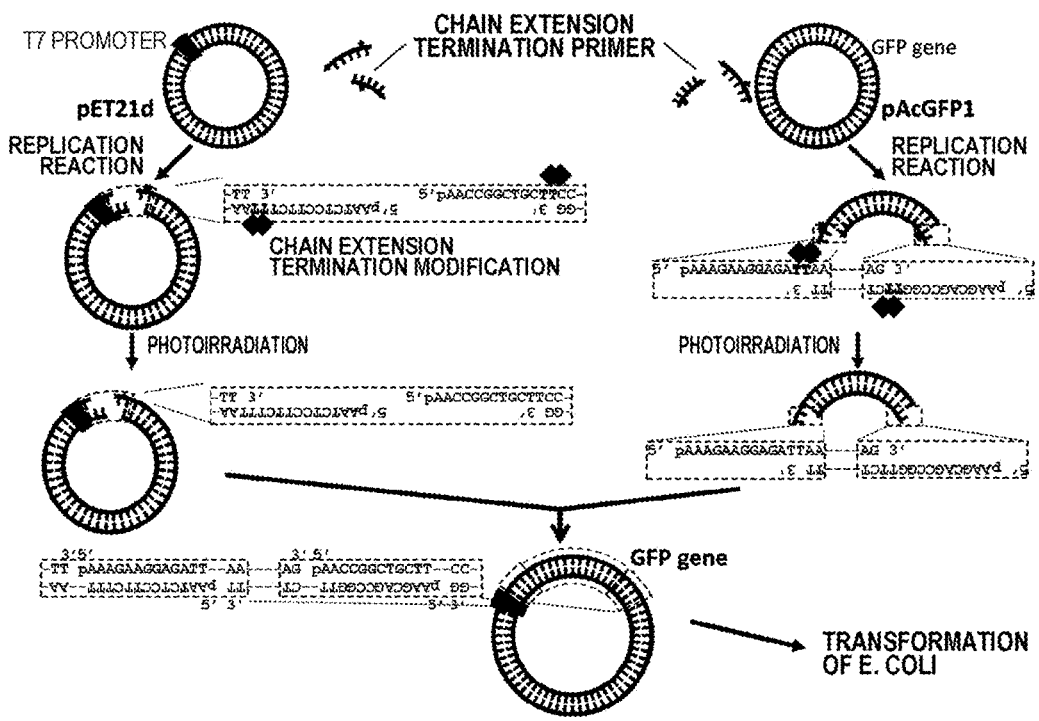
[FIG. 6]
(a) Primer    5' Fluorescein-ACCGAGCTCGAATTCGCC
   Template  0T    3' TGGCTCGAGCTTAAGCGGGATATCACTCAGCA 5'
             1T    3' TGGCTCGAGCTTAAGCGGGATAT**CACTCAGCA 5'
             2T    3' TGGCTCGAGCTTAAGCGGGATATTACTCAGCA 5'
(b) Q5® High-Fidelity DNA Polymerase
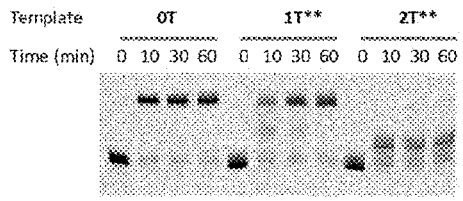
(c) Pfu DNA Polymerase
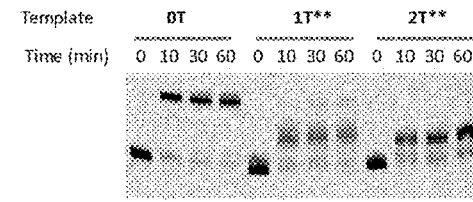

[FIG. 7]
a) HPLC OF RAW MATERIAL
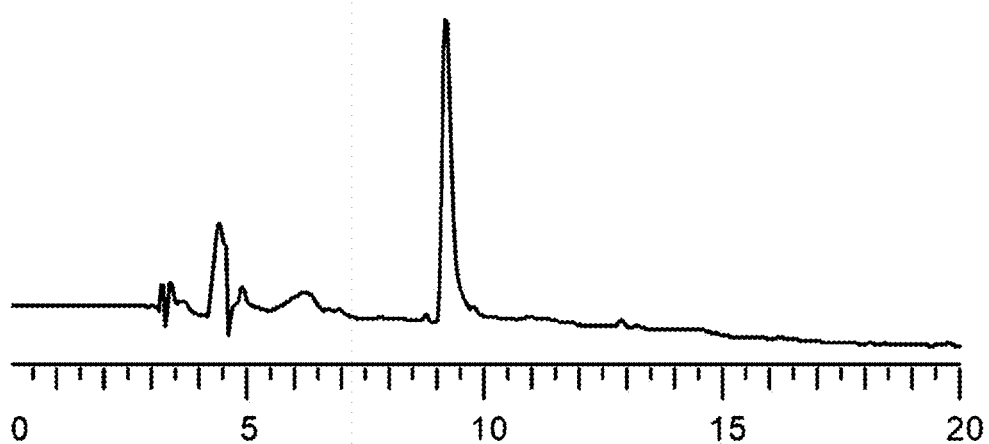
b) HPLC AFTER ADDITION OF REAGENT
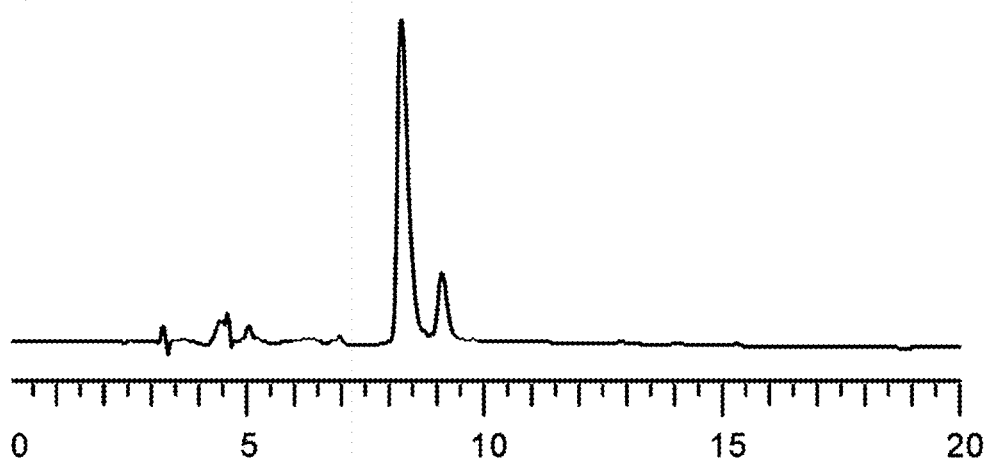

[FIG. 8]
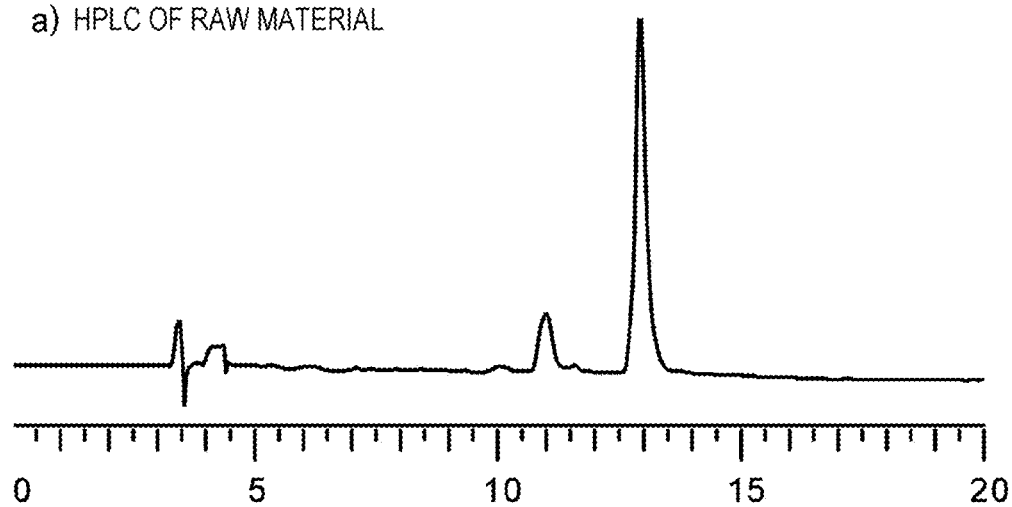
a) HPLC OF RAW MATERIAL
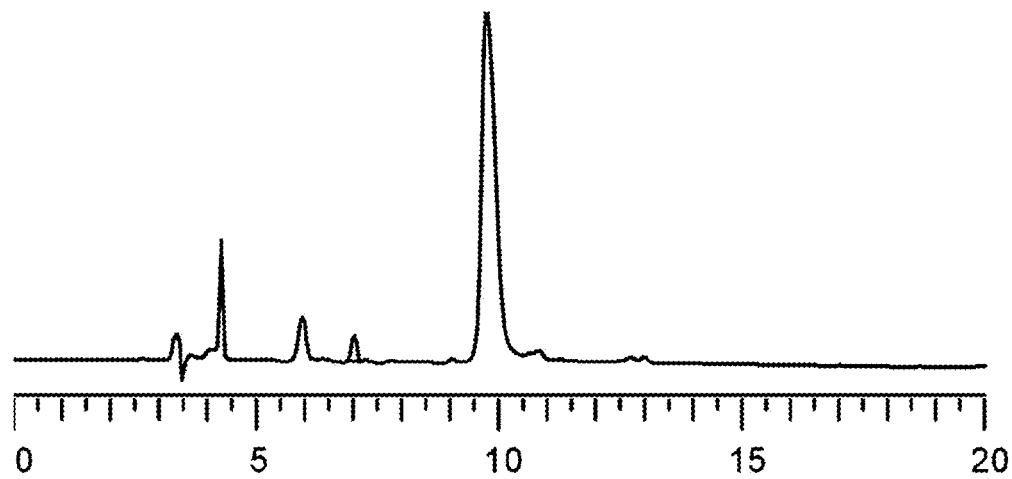
b) HPLC AFTER ADDITION OF REAGENT

[FIG. 9]
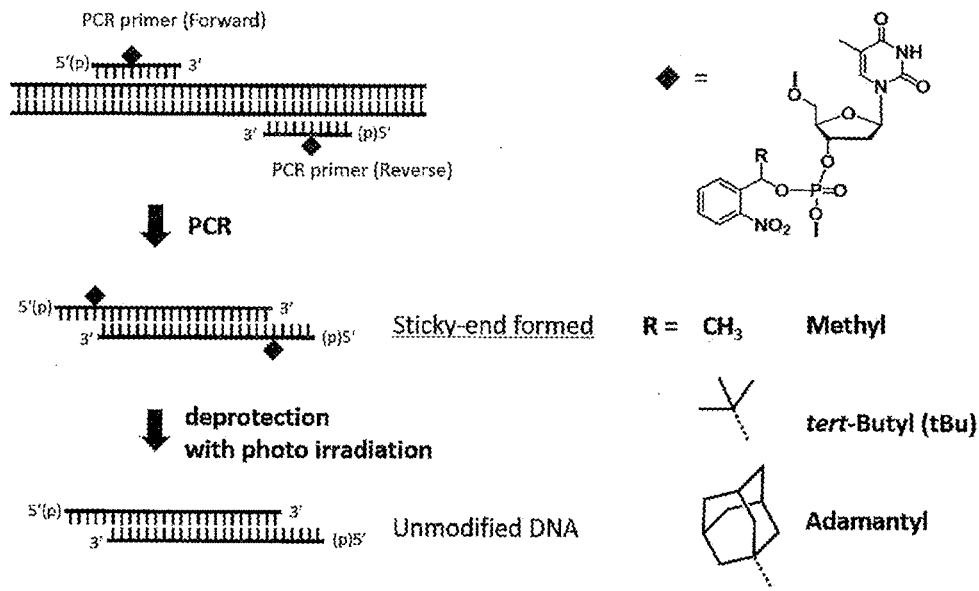
[FIG. 10]
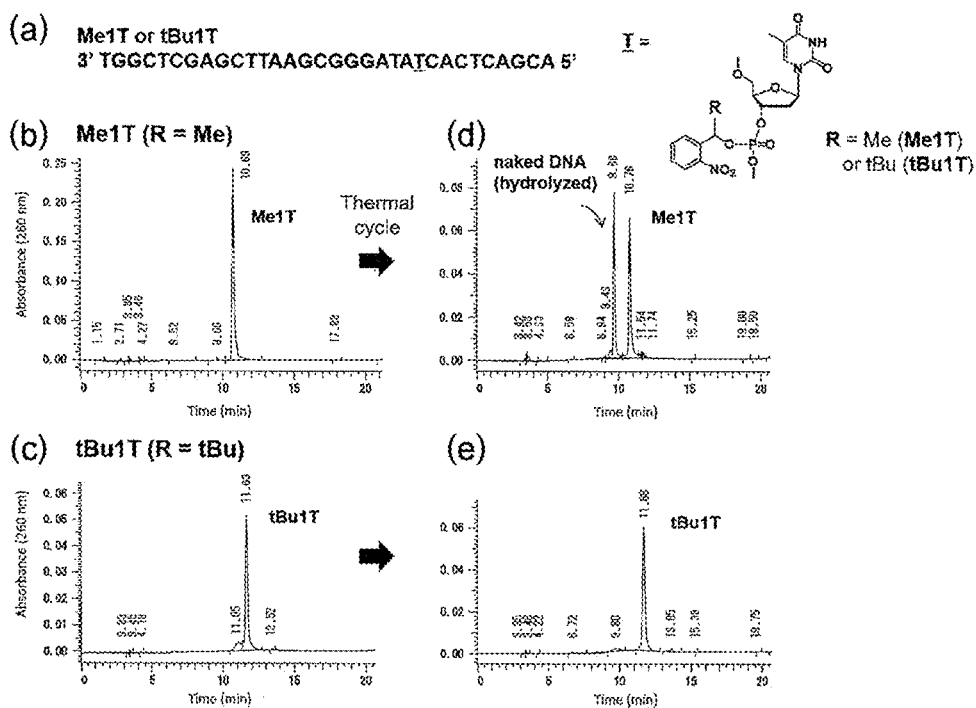

[FIG. 11]
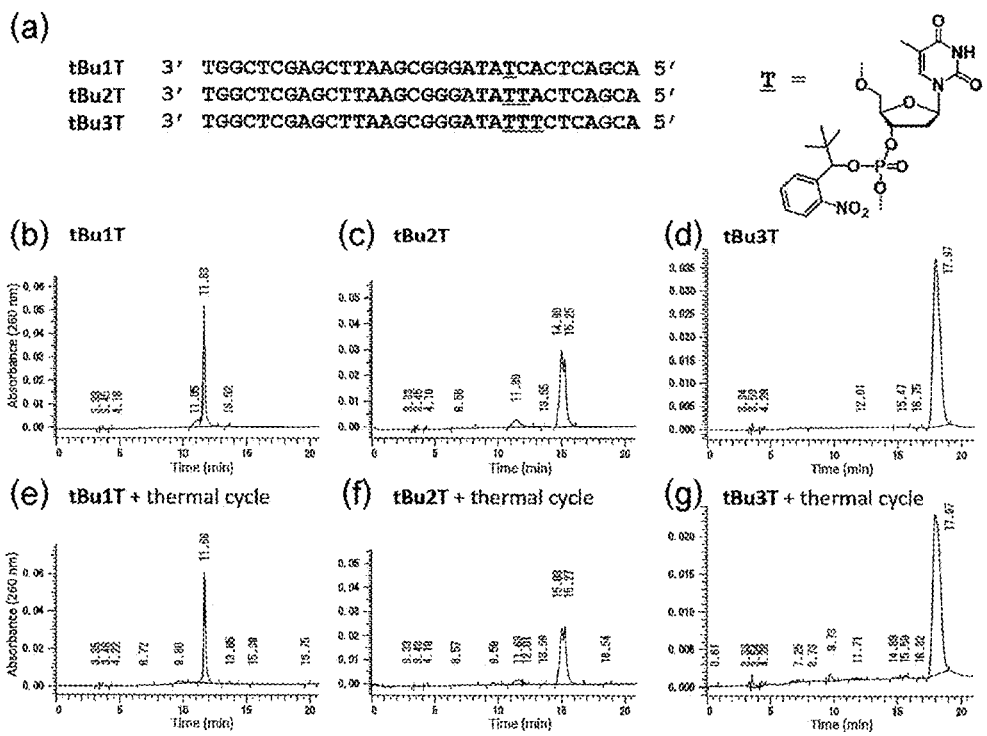
[FIG. 12]
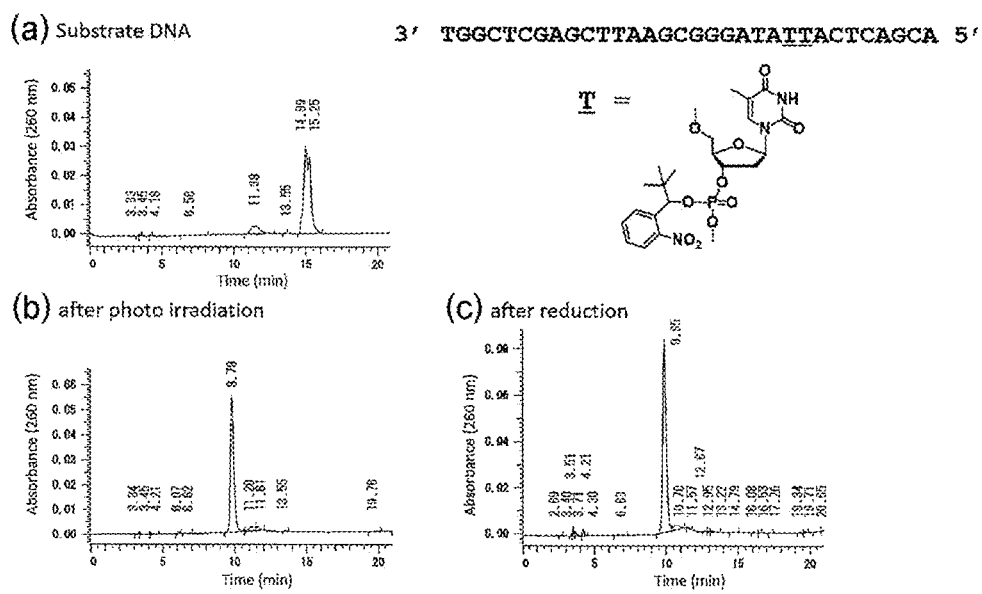

[FIG. 13]
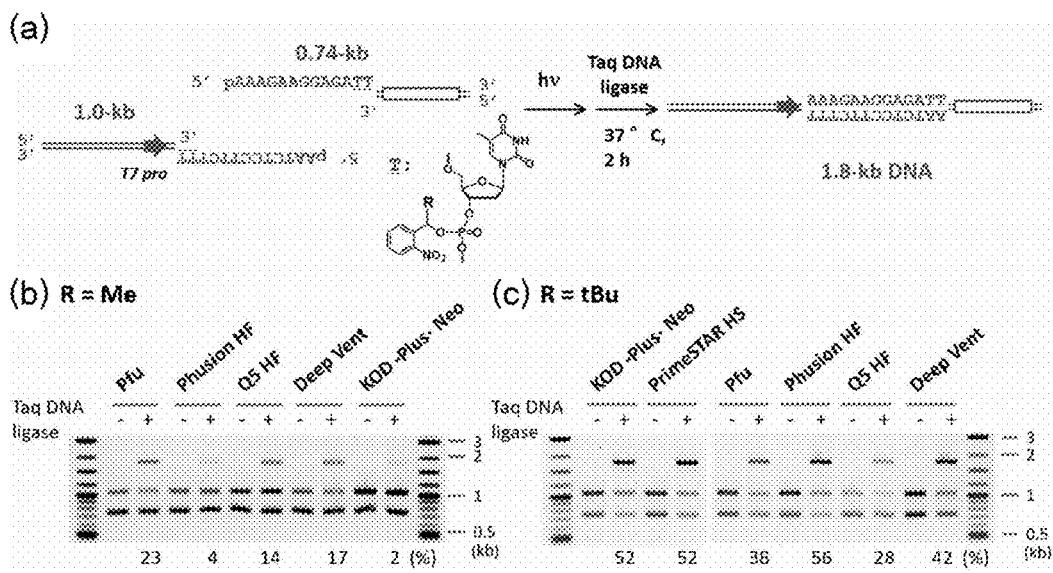
[FIG. 14]
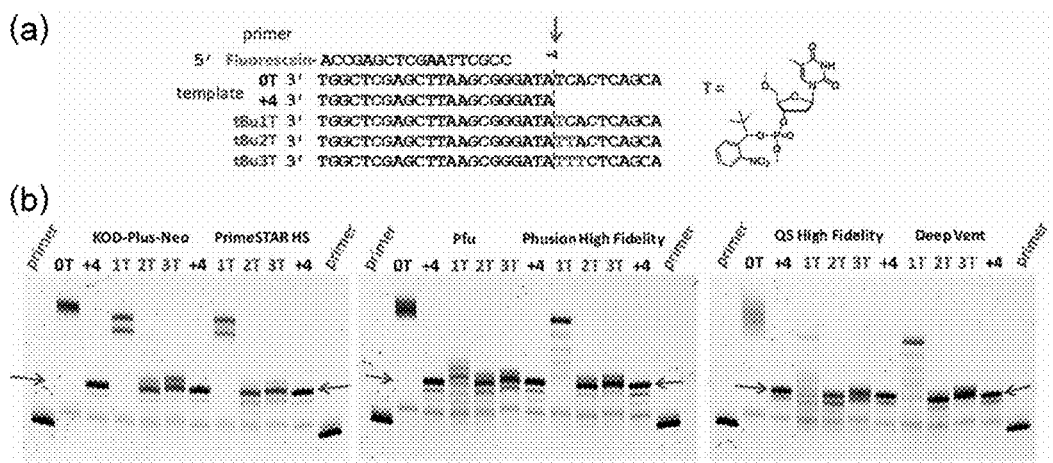

[FIG. 15]
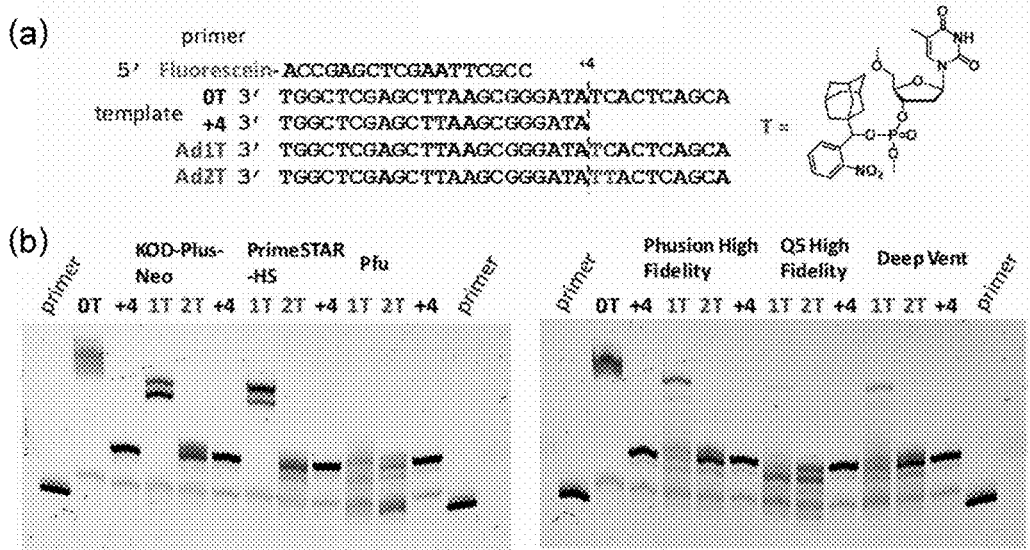
[FIG. 16]
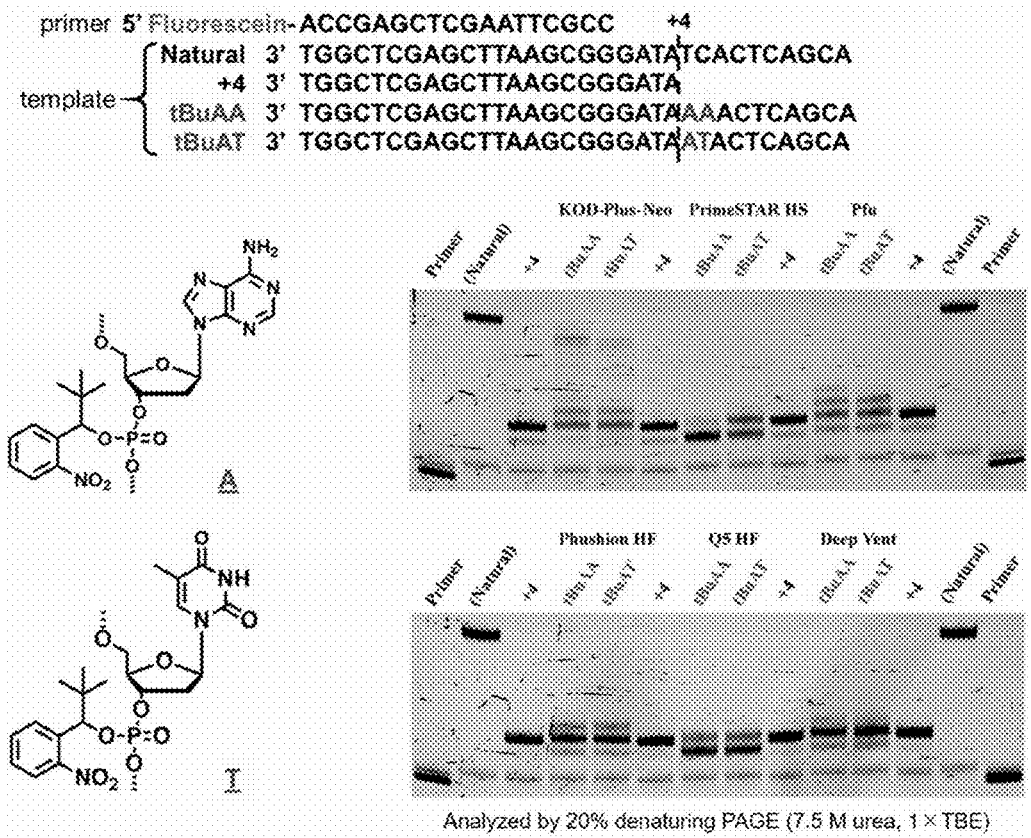

[FIG. 17]
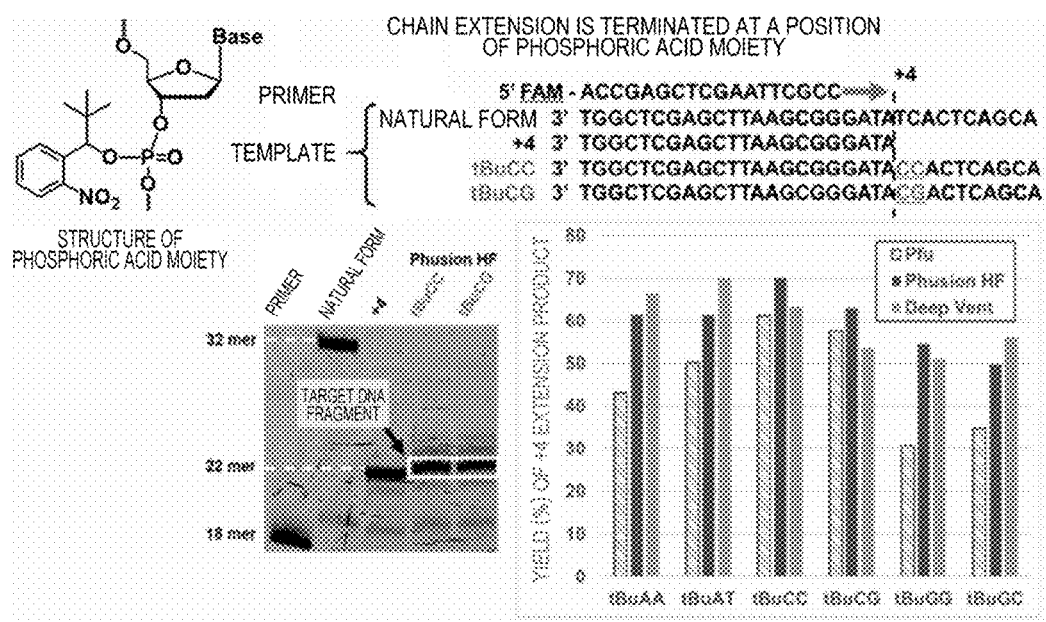

SEQUENCE LISTING

```
<160> NUMBER OF SEQ ID NOS: 40

<210> SEQ ID NO 1
<211> LENGTH: 32
<212> TYPE: DNA
<213> ORGANISM: Artificial Sequence
<220> FEATURE:
<223> OTHER INFORMATION: oligonucleotide 1T
<220> FEATURE:
<221> NAME/KEY: misc_feature
<222> LOCATION: (10)..(10)
<223> OTHER INFORMATION: n is chain extension termination caged analog
      T*

<400> SEQUENCE: 1
acgactcacn atagggcgaa ttcgagctcg gt                                    32

<210> SEQ ID NO 2
<211> LENGTH: 32
<212> TYPE: DNA
<213> ORGANISM: Artificial Sequence
<220> FEATURE:
<223> OTHER INFORMATION: oligonucelotide 2T
<220> FEATURE:
<221> NAME/KEY: misc_feature
<222> LOCATION: (9)..(9)
<223> OTHER INFORMATION: n is chain extension termination caged analog
      T*
```

```
<220> FEATURE:
<221> NAME/KEY: misc_feature
<222> LOCATION: (10)..(10)
<223> OTHER INFORMATION: n is chain extension termination caged analog
      T*

<400> SEQUENCE: 2
acgactcann atagggcgaa ttcgagctcg gt                                       32

<210> SEQ ID NO 3
<211> LENGTH: 35
<212> TYPE: DNA
<213> ORGANISM: Artificial Sequence
<220> FEATURE:
<223> OTHER INFORMATION: pAcGFP Forward
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (12)..(12)
<223> OTHER INFORMATION: n is chain extension termination caged analog
      T*
<220> FEATURE:
<221> NAME/KEY: misc_feature
<222> LOCATION: (13)..(13)
<223> OTHER INFORMATION: n is chain extension termination caged analog
      T*

<400> SEQUENCE: 3
aaagaaggag annaaccatg gtgagcaagg gcgcc                                    35

<210> SEQ ID NO 4
<211> LENGTH: 34
<212> TYPE: DNA
<213> ORGANISM: Artificial Sequence
<220> FEATURE:
<223> OTHER INFORMATION: pAcGFP Reverse
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (11)..(11)
<223> OTHER INFORMATION: n is chain extension termination caged analog
      T*
<220> FEATURE:
<221> NAME/KEY: misc_feature
<222> LOCATION: (12)..(12)
<223> OTHER INFORMATION: n is chain extension termination caged analog
      T*

<400> SEQUENCE: 4
aagcagccgg nnctcacttg tacagctcat ccat                                     34

<210> SEQ ID NO 5
<211> LENGTH: 29
<212> TYPE: DNA
<213> ORGANISM: Artificial Sequence
<220> FEATURE:
<223> OTHER INFORMATION: pET21d Foward
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (11)..(11)
```

```
<223> OTHER INFORMATION: n is chain extension termination caged analog
      T*
<220> FEATURE:
<221> NAME/KEY: misc_feature
<222> LOCATION: (12)..(12)
<223> OTHER INFORMATION: n is chain extension termination caged analog
      T*

<400> SEQUENCE: 5
aaccggctgc nnccaaagcc cgaaaggaa                                       29

<210> SEQ ID NO 6
<211> LENGTH: 38
<212> TYPE: DNA
<213> ORGANISM: Artificial Sequence
<220> FEATURE:
<223> OTHER INFORMATION: pET21d Reverse
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (12)..(12)
<223> OTHER INFORMATION: n is chain extension termination caged analog
      T*
<220> FEATURE:
<221> NAME/KEY: misc_feature
<222> LOCATION: (13)..(13)
<223> OTHER INFORMATION: n is chain extension termination caged analog
      T*

<400> SEQUENCE: 6
aatctccttc tnnaagttaa acaaaattat ttctagag                             38

<210> SEQ ID NO 7
<211> LENGTH: 18
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (1)..(1)
<223> OTHER INFORMATION: 5'-fluorescein

<400> SEQUENCE: 7
accgagctcg aattcgcc                                                   18

<210> SEQ ID NO 8
<211> LENGTH: 20
<212> TYPE: DNA
<213> ORGANISM: Artificial Sequence
<220> FEATURE:
<223> OTHER INFORMATION: PCR primer

<400> SEQUENCE: 8
taatacgact cactataggg                                                 20

<210> SEQ ID NO 9
<211> LENGTH: 19
<212> TYPE: DNA
<213> ORGANISM: Artificial Sequence
<220> FEATURE:
<223> OTHER INFORMATION: PCR primer

<400> SEQUENCE: 9
gctagttatt gctcagcgg                                                  19
```

```
<210> SEQ ID NO 10
<211> LENGTH: 20
<212> TYPE: DNA
<213> ORGANISM: Artificial Sequence
<220> FEATURE:
<223> OTHER INFORMATION: primer

<400> SEQUENCE: 10
ggtgatgtcg gcgatatagg                                               20

<210> SEQ ID NO 11
<211> LENGTH: 21
<212> TYPE: DNA
<213> ORGANISM: Artificial Sequence
<220> FEATURE:
<223> OTHER INFORMATION: primer

<400> SEQUENCE: 11
gccaatccgg atatagttcc t                                             21

<210> SEQ ID NO 12
<211> LENGTH: 32
<212> TYPE: DNA
<213> ORGANISM: Artificial Sequence
<220> FEATURE:
<223> OTHER INFORMATION: oligonucleotide 0T

<400> SEQUENCE: 12
acgactcact atagggcgaa ttcgagctcg gt                                 32

<210> SEQ ID NO 13
<211> LENGTH: 32
<212> TYPE: DNA
<213> ORGANISM: Artificial Sequence
<220> FEATURE:
<223> OTHER INFORMATION: oligonucleotide 1T
<220> FEATURE:
<221> NAME/KEY: misc_feature
<222> LOCATION: (10)..(10)
<223> OTHER INFORMATION: n is cleavage analog T**

<400> SEQUENCE: 13
acgactcacn atagggcgaa ttcgagctcg gt                                 32

<210> SEQ ID NO 14
<211> LENGTH: 32
<212> TYPE: DNA
<213> ORGANISM: Artificial Sequence
<220> FEATURE:
<223> OTHER INFORMATION: oligonucleotide 2T
<220> FEATURE:
<221> NAME/KEY: misc_feature
<222> LOCATION: (10)..(10)
<223> OTHER INFORMATION: n is cleavage analog T**
<220> FEATURE:
<221> NAME/KEY: misc_feature
<222> LOCATION: (11)..(11)
<223> OTHER INFORMATION: n is cleavage analog T**

<400> SEQUENCE: 14
acgactcacn ntagggcgaa ttcgagctcg gt                                 32

<210> SEQ ID NO 15
<211> LENGTH: 21
<212> TYPE: DNA
<213> ORGANISM: Artificial Sequence
<220> FEATURE:
<223> OTHER INFORMATION: primer forward
```

<400> SEQUENCE: 15
cgccgagaca gaacttaatg g                                              21

<210> SEQ ID NO 16
<211> LENGTH: 38
<212> TYPE: DNA
<213> ORGANISM: Artificial Sequence
<220> FEATURE:
<223> OTHER INFORMATION: primer reverse
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (12)..(12)
<223> OTHER INFORMATION: n is thymine modified with a cleavage analog
      with Me- or tBu-type modified group contained in the phosphoric
      acid moiety
<220> FEATURE:
<221> NAME/KEY: misc_feature
<222> LOCATION: (13)..(13)
<223> OTHER INFORMATION: n is thymine modified with a cleavage analog
      with Me- or tBu-type modified group contained in the phosphoric
      acid moiety

<400> SEQUENCE: 16
aatctccttc tnnaagttaa acaaaattat ttctagag                            38

<210> SEQ ID NO 17
<211> LENGTH: 35
<212> TYPE: DNA
<213> ORGANISM: Artificial Sequence
<220> FEATURE:
<223> OTHER INFORMATION: primer forward
<220> FEATURE:
<221> NAME/KEY: misc_feature
<222> LOCATION: (1)..(1)
<223> OTHER INFORMATION: phosphorylation of the hydroxyl group at the 5'
      end
<220> FEATURE:
<221> NAME/KEY: misc_feature
<222> LOCATION: (12)..(12)
<223> OTHER INFORMATION: n is thymine modified with a cleavage analog
      with Me- or tBu-type modified group contained in the phosphoric
      acid moiety
<220> FEATURE:
<221> NAME/KEY: misc_feature
<222> LOCATION: (13)..(13)
<223> OTHER INFORMATION: n is thymine modified with a cleavage analog
      with Me- or tBu-type modified group contained in the phosphoric
      acid moiety

<400> SEQUENCE: 17
aaagaaggag annaaccatg gtgagcaagg gcgcc                               35

<210> SEQ ID NO 18
<211> LENGTH: 34
<212> TYPE: DNA
<213> ORGANISM: Artificial Sequence
<220> FEATURE:
<223> OTHER INFORMATION: primer reverse

<400> SEQUENCE: 18
gcaaccaagc ttctcacttg tacagctcat ccat                                34

<210> SEQ ID NO 19
<211> LENGTH: 32
<212> TYPE: DNA

```
<213> ORGANISM: Artificial Sequence
<220> FEATURE:
<223> OTHER INFORMATION: 0T Template

<400> SEQUENCE: 19
tggctcgagc ttaagcggga tatcactcag ca                                    32

<210> SEQ ID NO 20
<211> LENGTH: 32
<212> TYPE: DNA
<213> ORGANISM: Artificial Sequence
<220> FEATURE:
<223> OTHER INFORMATION: 1T Template
<220> FEATURE:
<221> NAME/KEY: misc_feature
<222> LOCATION: (23)..(23)
<223> OTHER INFORMATION: n is a, c, g, or t

<400> SEQUENCE: 20
tggctcgagc ttaagcggga tancactcag ca                                    32

<210> SEQ ID NO 21
<211> LENGTH: 32
<212> TYPE: DNA
<213> ORGANISM: Artificial Sequence
<220> FEATURE:
<223> OTHER INFORMATION: 2T Template
<220> FEATURE:
<221> NAME/KEY: misc_feature
<222> LOCATION: (23)..(24)
<223> OTHER INFORMATION: n is a, c, g, or t

<400> SEQUENCE: 21
tggctcgagc ttaagcggga tannactcag ca                                    32

<210> SEQ ID NO 22
<211> LENGTH: 14
<212> TYPE: DNA
<213> ORGANISM: Artificial Sequence
<220> FEATURE:
<223> OTHER INFORMATION: PCR Fragment

<400> SEQUENCE: 22
aaccggctgc ttcc                                                        14

<210> SEQ ID NO 23
<211> LENGTH: 15
<212> TYPE: DNA
<213> ORGANISM: Artificial Sequence
<220> FEATURE:
<223> OTHER INFORMATION: PCR Fragment

<400> SEQUENCE: 23
aatctccttc tttaa                                                       15

<210> SEQ ID NO 24
<211> LENGTH: 15
<212> TYPE: DNA
<213> ORGANISM: Artificial Sequence
<220> FEATURE:
<223> OTHER INFORMATION: PCR Fragment

<400> SEQUENCE: 24
aaagaaggag attaa                                                       15

<210> SEQ ID NO 25
<211> LENGTH: 14
```

```
<212> TYPE: DNA
<213> ORGANISM: Artificial Sequence
<220> FEATURE:
<223> OTHER INFORMATION: PCR Fragment

<400> SEQUENCE: 25
aagcagccgg ttct                                                        14

<210> SEQ ID NO 26
<211> LENGTH: 32
<212> TYPE: DNA
<213> ORGANISM: Artificial Sequence
<220> FEATURE:
<223> OTHER INFORMATION: 1T Template
<220> FEATURE:
<221> NAME/KEY: misc_feature
<222> LOCATION: (23)..(23)
<223> OTHER INFORMATION: n is a, c, g, or t

<400> SEQUENCE: 26
tggctcgagc ttaagcggga tancactcag ca                                    32

<210> SEQ ID NO 27
<211> LENGTH: 32
<212> TYPE: DNA
<213> ORGANISM: Artificial Sequence
<220> FEATURE:
<223> OTHER INFORMATION: 2T Template
<220> FEATURE:
<221> NAME/KEY: misc_feature
<222> LOCATION: (23)..(24)
<223> OTHER INFORMATION: n is a, c, g, or t

<400> SEQUENCE: 27
tggctcgagc ttaagcggga tannactcag ca                                    32

<210> SEQ ID NO 28
<211> LENGTH: 32
<212> TYPE: DNA
<213> ORGANISM: Artificial Sequence
<220> FEATURE:
<223> OTHER INFORMATION: tBu1T Template
<220> FEATURE:
<221> NAME/KEY: misc_feature
<222> LOCATION: (23)..(23)
<223> OTHER INFORMATION: n is modified thymine defined as T(underscore)
      in Fig.11(a)

<400> SEQUENCE: 28
tggctcgagc ttaagcggga tancactcag ca                                    32

<210> SEQ ID NO 29
<211> LENGTH: 32
<212> TYPE: DNA
<213> ORGANISM: Artificial Sequence
<220> FEATURE:
<223> OTHER INFORMATION: tBu2T Template
<220> FEATURE:
<221> NAME/KEY: misc_feature
<222> LOCATION: (23)..(24)
<223> OTHER INFORMATION: n is a, c, g, or t
<220> FEATURE:
<221> NAME/KEY: misc_feature
<222> LOCATION: (23)..(24)
<223> OTHER INFORMATION: n is modified thymine defined as T(underscore)
      in Fig.11(a)
<220> FEATURE:
<221> NAME/KEY: misc_feature
<222> LOCATION: (33)..(33)
<223> OTHER INFORMATION: n is a, c, g, or t
```

```
<400> SEQUENCE: 29
tggctcgagc ttaagcggga tannactcag ca                                32

<210> SEQ ID NO 30
<211> LENGTH: 32
<212> TYPE: DNA
<213> ORGANISM: Artificial Sequence
<220> FEATURE:
<223> OTHER INFORMATION: tBu3T Template
<220> FEATURE:
<221> NAME/KEY: misc_feature
<222> LOCATION: (23)..(25)
<223> OTHER INFORMATION: n is modified thymine defined as T(underscore)
      in Fig.11(a)

<400> SEQUENCE: 30
tggctcgagc ttaagcggga tannnctcag ca                                32

<210> SEQ ID NO 31
<211> LENGTH: 13
<212> TYPE: DNA
<213> ORGANISM: Artificial Sequence
<220> FEATURE:
<223> OTHER INFORMATION: PCR Product
<220> FEATURE:
<221> NAME/KEY: misc_feature
<222> LOCATION: (12)..(13)
<223> OTHER INFORMATION: n is modified thymine defined as T(underscore)
      in Fig.11(a)

<400> SEQUENCE: 31
aaagaaggag ann                                                     13

<210> SEQ ID NO 32
<211> LENGTH: 13
<212> TYPE: DNA
<213> ORGANISM: Artificial Sequence
<220> FEATURE:
<223> OTHER INFORMATION: PCR Product

<400> SEQUENCE: 32
aaagaaggag att                                                     13

<210> SEQ ID NO 33
<211> LENGTH: 13
<212> TYPE: DNA
<213> ORGANISM: Artificial Sequence
<220> FEATURE:
<223> OTHER INFORMATION: PCR Product

<400> SEQUENCE: 33
aatctccttc ttt                                                     13

<210> SEQ ID NO 34
<211> LENGTH: 22
<212> TYPE: DNA
<213> ORGANISM: Artificial Sequence
<220> FEATURE:
<223> OTHER INFORMATION: +4 Template

<400> SEQUENCE: 34
tggctcgagc ttaagcggga ta                                           22

<210> SEQ ID NO 35
<211> LENGTH: 32
<212> TYPE: DNA
<213> ORGANISM: Artificial Sequence
```

```
<220> FEATURE:
<223> OTHER INFORMATION: Ad1T Template
<220> FEATURE:
<221> NAME/KEY: misc_feature
<222> LOCATION: (23)..(23)
<223> OTHER INFORMATION: n is modified thymine defined as T in Fig.15(a)

<400> SEQUENCE: 35
tggctcgagc ttaagcggga tancactcag ca                                    32

<210> SEQ ID NO 36
<211> LENGTH: 32
<212> TYPE: DNA
<213> ORGANISM: Artificial Sequence
<220> FEATURE:
<223> OTHER INFORMATION: Ad2T Template
<220> FEATURE:
<221> NAME/KEY: misc_feature
<222> LOCATION: (23)..(24)
<223> OTHER INFORMATION: n is modified thymine defined as T in Fig.15(a)

<400> SEQUENCE: 36
tggctcgagc ttaagcggga tannactcag ca                                    32

<210> SEQ ID NO 37
<211> LENGTH: 32
<212> TYPE: DNA
<213> ORGANISM: Artificial Sequence
<220> FEATURE:
<223> OTHER INFORMATION: tBuAA Template
<220> FEATURE:
<221> NAME/KEY: misc_feature
<222> LOCATION: (23)..(24)
<223> OTHER INFORMATION: n is modified adenosine defined as
      A(underscore) in Fig.16

<400> SEQUENCE: 37
tggctcgagc ttaagcggga tannactcag ca                                    32

<210> SEQ ID NO 38
<211> LENGTH: 32
<212> TYPE: DNA
<213> ORGANISM: Artificial Sequence
<220> FEATURE:
<223> OTHER INFORMATION: tBuAT Template
<220> FEATURE:
<221> NAME/KEY: misc_feature
<222> LOCATION: (23)..(23)
<223> OTHER INFORMATION: n is modified adenosine defined as
      A(underscore) in Fig.16
<220> FEATURE:
<221> NAME/KEY: misc_feature
<222> LOCATION: (24)..(24)
<223> OTHER INFORMATION: n is modified thymine defined as T(underscore)
      in Fig.16

<400> SEQUENCE: 38
tggctcgagc ttaagcggga tannactcag ca                                    32

<210> SEQ ID NO 39
<211> LENGTH: 32
<212> TYPE: DNA
<213> ORGANISM: Artificial Sequence
<220> FEATURE:
<223> OTHER INFORMATION: tBuCC Template
<220> FEATURE:
<221> NAME/KEY: misc_feature
<222> LOCATION: (23)..(24)
<223> OTHER INFORMATION: n is modified cytosine defined as "STRUCTURE OF
      PHOSPHORIC ACID MOIETY"in Fig.16
```

```
<400> SEQUENCE: 39
tggctcgagc ttaagcggga tannactcag ca                              32

<210> SEQ ID NO 40
<211> LENGTH: 32
<212> TYPE: DNA
<213> ORGANISM: Artificial Sequence
<220> FEATURE:
<223> OTHER INFORMATION: tBuCG Template
<220> FEATURE:
<221> NAME/KEY: misc_feature
<222> LOCATION: (23)..(23)
<223> OTHER INFORMATION: n is modified cytosine defined as "STRUCTURE OF
      PHOSPHORIC ACID MOIETY"in Fig.16
<220> FEATURE:
<221> NAME/KEY: misc_feature
<222> LOCATION: (24)..(24)
<223> OTHER INFORMATION: n is modified guanosine defined as "STRUCTURE
      OF PHOSPHORIC ACID MOIETY"in Fig.16

<400> SEQUENCE: 40
tggctcgagc ttaagcggga tannactcag ca                              32
```

PRIMER, DEVICE FOR PRODUCING DOUBLE-STRANDED DNA USING PRIMER, AND METHOD FOR PRODUCING DOUBLE-STRANDED DNA USING PRIMER

CROSS-REFERENCE TO RELATED APPLICATIONS

This application is the United States national phase of International Application No. PCT/JP2020/029442 filed Jul. 31, 2020, and claims priority to Japanese Patent Application No. 2019-140852 filed Jul. 31, 2019, the disclosures of which are hereby incorporated by reference in their entirety. The Sequence Listing associated with this application is filed in electronic format via Patent Center and is hereby incorporated by reference into the specification in its entirety. The name of the text file containing the Sequence Listing is 2200301-1_ST25.txt. The size of the text file is 12,644 bytes, and the text file was created on Jun. 11, 2025.

BACKGROUND OF THE INVENTION

Field of the Invention

The present invention relates to a primer, a device for producing double-stranded DNA using the primer, and a method for producing double-stranded DNA using the primer.

Description of Related Art

In the field of molecular biology or the like, a vector obtained by incorporating a target DNA into a host has been used in order to perform gene recombination, transformation, or the like. In general, the target DNA is amplified for use by polymerase chain reaction (PCR) in a case where the amount is small. In the PCR, by using a template DNA containing a target DNA sequence and using a primer that binds complementarily to the template DNA, the template DNA is amplified by repeating a cycle of thermal denaturation and annealing multiple times.

An amplification product obtained by amplifying a template DNA by PCR has blunt ends originally, and it is necessary to perform a treatment for binding (ligating) the amplification product to a host DNA such as a plasmid DNA. In general, in such a treatment, a restriction enzyme that cleaves a specific sequence is used, but in this method, there is a problem that the versatility is poor because the DNA that can be bound depends on the sequence at a cleavage site of the restriction enzyme.

As the method in which any restriction enzyme is not used, there is a technique for constructing a vector by forming the 3' end and 5' end of an amplification product as sticky ends (also referred to as "cohesive ends", "protruding ends" or the like), forming sticky ends also on the host side in a similar way, and ligating both of the ends. For example, as such a technique, Gibson assembly method, In-Fusion method, SLiCE method, or the like has been known in recent years. In any case of these methods, the end of a double-stranded DNA fragment is provided with a homologous sequence of around 15 bp, and the strand on one side in the double strand is digested with exonuclease activity to generate a sticky end, and then the sticky end is ligated. Note that in the Gibson assembly method, the ends are ligated by using a Taq DNA ligase in vitro, and in the In-Fusion method, the ends are ligated by using a repair system in *E. coli*.

In these methods, since an exonuclease that is an enzyme is used, a significant cost is required, and further, the site specificity may be inferior depending on the reaction conditions and the like, and it is difficult to quantitatively form sticky ends, and thus there has been a problem that the efficiency of ligation reaction is low. For this reason, a seamless cloning method in which an enzyme is not used has been demanded.

Accordingly, a method for preparing DNA having sticky ends by a chemical technique has been developed, and as the primer for PCR for the method, a primer disclosed in WO 2009/113709 is known. In the primer of this literature, a base corresponding to the 3' end in the nucleotide sequence of a non-complementary DNA part is modified with a protecting group. This protecting group has a function of terminating the progress of DNA replication by DNA polymerase, and can be desorbed from the base to be modified by photoirradiation treatment, alkali treatment, or the like. In addition, in this literature, a protecting group (substituent) is introduced into the base of a primer by using a substituent introduction agent for introducing the protecting group into a biomolecule.

CITATION LIST

Patent Literature

Patent Literature 1: WO 2009/113709 (claim 1, claim 2, and the like)

SUMMARY OF INVENTION

Technical Problem

In WO 2009/113709, the progress of DNA replication is terminated in the moiety of a protecting group, but the polymerase activity is inhibited by the protecting group in a part of the base, and thus the termination efficiency is low, and as a result, a completely extended product may be produced. Further, for example, in DNA, there are four kinds of bases of adenine, guanine, cytosine, and thymine, and in WO 2009/113709, since a protecting group is introduced into a base, it is necessary to introduce the protecting group by a method depending on the kind of the base, and thus labor and cost are required to produce a primer.

An object of the present invention is to provide a primer that has high termination efficiency and further can be produced at a low cost. Further, another object of the present invention is to provide a device for producing double-stranded DNA having sticky ends and a method for producing double-stranded DNA, which each use the primer described above.

The present inventors have conducted the intensive studies to solve the problem described above. As a result, the present inventors have developed a primer in which a decomposable protecting group is introduced into a sugar moiety of the nucleoside. Further, the present inventors have found that by decomposing the protecting group, double-stranded DNA having sticky ends can be prepared, and thus have completed the present invention.

That is, the present invention is a primer used for amplifying a nucleic acid, having a structure represented by the following formula (1):

[Chemical formula 1]

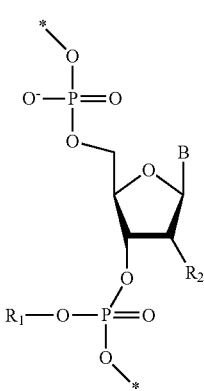
(1)

where, B represents a base, $R_1$ represents a decomposable protecting group, $R_2$ represents hydrogen or a hydroxyl group, and the symbol * represents a bond to a sugar of an adjacent nucleotide.

In this case, it is preferable that the $R_1$ is a photodecomposable protecting group represented by the following formula (2A):

[Chemical formula 2]

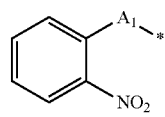
(2A)

where, $A_1$ represents an alkylene group having 1 to 3 carbon atoms, and may have a branched chain having 1 to 20 carbon atoms, and the symbol * represents a bond to oxygen (O) of phosphoric acid.

Further, in this case, it is preferable that the $R_1$ is a photodecomposable protecting group represented by the following formula (4A):

[Chemical formula 3]

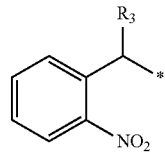
(4A)

where $R_3$ represents an alkyl group having 1 to 20 carbon atoms.

In the above case, it is more preferable that the $R_3$ is a tert-butyl group or an adamantyl group. In particular, it is suitable that the $R_3$ is a tert-butyl group.

Further, it is preferable that the $R_1$ is a 2-nitrobenzyl group represented by the following formula (3A):

[Chemical formula 4]

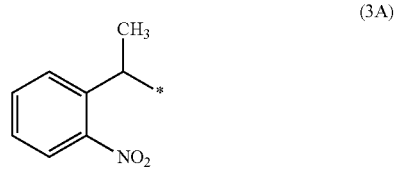
(3A)

Alternatively, it is preferable that the $R_1$ is a reducing agent-decomposable protecting group represented by the following formula (2B):

[Chemical formula 5]

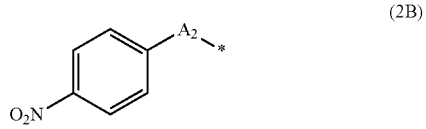
(2B)

where, $A_2$ represents an alkylene group having 1 to 3 carbon atoms, and may have a branched chain having 1 to 20 carbon atoms, and the symbol * represents a bond to oxygen (O) of phosphoric acid.

In this case, it is preferable that the $R_1$ is a 4-nitrobenzyl group represented by the following formula (3B):

[Chemical formula 6]

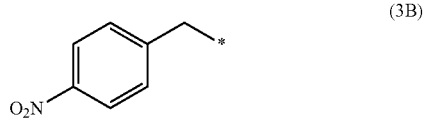
(3B)

It is preferable that two or more structures each represented by the formula (1) are continuous in a sequence.

Further, the present invention is a device for producing double-stranded DNA having sticky ends by using the primer described in any one of the above items, including: a forward primer being complementary to a part of a sequence of an antisense strand of a template DNA to be used as a template and having a structure represented by the formula (1); a reverse primer being complementary to a part of a sequence of a sense strand of the template DNA and having a structure represented by the formula (1); an amplification unit for performing multiple cycles of polymerase chain reaction (PCR) by using the template DNA as a template to form a forward-side extended chain being the forward primer extended and a reverse-side extended chain being the reverse primer extended, and for annealing the forward-side extended chain and the reverse-side extended chain to form double-stranded DNA with 3'-recessed ends; and a deprotection unit for deprotecting the $R_1$.

Furthermore, the present invention is a method for producing double-stranded DNA having sticky ends by using the primer described in any one of the above items, including: a preparation step of preparing a forward primer being complementary to a part of a sequence of an antisense strand of a template DNA to be used as a template and having a structure represented by the formula (1), and a reverse primer being complementary to a part of a sequence of a sense strand of the template DNA and having a structure represented by the formula (1); an amplification step of performing multiple cycles of polymerase chain reaction (PCR) by using the template DNA as a template to form a forward-side extended chain being the forward primer extended and a reverse-side extended chain being the reverse primer extended, and of annealing the forward-side extended chain and the reverse-side extended chain to form double-stranded DNA with 3'-recessed ends; and a deprotection step of deprotecting the $R_1$.

In this case, it is preferable that the $R_1$ is a photodecomposable protecting group represented by the formula (2A) and is deprotected by photoirradiation in the deprotection step.

Alternatively, it is preferable that the $R_1$ is a reducing agent-decomposable protecting group represented by the formula (2B), and is deprotected by a reducing agent in the deprotection step.

In addition, it is preferable that the primer has a sequence in which two or more structures each represented by the formula (1) are continuous.

According to the present invention, a primer that has high termination efficiency and further can be produced at a low cost can be provided. Further, according to the present invention, a device for producing double-stranded DNA having sticky ends and a method for producing double-stranded DNA, which each use the primer described above, can be provided.

BRIEF DESCRIPTION OF DRAWINGS

FIG. 1 is a schematic diagram showing a method and a device, for producing double-stranded DNA having sticky ends.

FIG. 2 shows chromatograms of (a) after deprotection and (b) after purification in synthesis of an oligonucleotide pAcGFP_Fw2.

FIG. 3 is a diagram showing termination of chain extension reaction by using an oligonucleotide containing a chain extension termination caged analog T* as a template, wherein the primer comprises SEQ ID NO: 7, template 0T is SEQ ID NO: 19, template 1T is SEQ ID NO: 20, and template 2T is SEQ ID NO: 21.

FIG. 4 is a diagram showing agarose gel electrophoresis analysis of PCR reaction.

FIG. 5 is a schematic diagram of ligation reaction of PCR fragment, including fragments SEQ ID NO: 22 (AACCGGCTGCTTCC), SEQ ID NO: 23 (AATCTCCTTCTTTAA), SEQ ID NO: 24 (AAAGAAGGAGATTAA), and SEQ ID NO: 25 (AAGCAGCCGGTTCT), parts of pET21d_Fw2, pET21d_Rev2, pAcGFP_FW2, and pAcGFP_Rev2 after light irradiation, irrespectively.

FIG. 6 is a diagram showing the experiment of preparing a sticky end by using an oligonucleotide containing T**, wherein the primer comprises SEQ ID NO: 7, template 0T is SEQ ID NO: 19, template 1T is SEQ ID NO: 26, and template 2T is SEQ ID NO: 27.

FIG. 7 is a diagram showing experimental results of deprotection reaction of 1T by using $Na_2S_2O_4$.

FIG. 8 is a diagram showing experimental results of deprotection reaction of 2T by using $Na_2S_2O_4$.

FIG. 9 is a diagram showing the outline of the experiment in which the substituent R in a phosphoric acid modifying group is made bulkier.

FIG. 10 is a diagram showing stability test results in thermal cycle conditions of a modified oligonucleotide, wherein the sequence shown is SEQ ID NO: 28.

FIG. 11 is a diagram showing results of the experiment, which shows that the modified primer is stable (decomposition resistance) in PCR conditions, wherein the tBu1T modified primer is SEQ ID NO: 28, the tBu2T modified primer is SEQ ID NO: 29, and the tBu3T modified primer is SEQ ID NO: 30.

FIG. 12 is a diagram showing experimental results of reversed-phase HPLC analysis of deprotection reaction of a tBu-type modified primer, wherein the sequence of the tBu-type modified primer is SEQ ID NO: 29.

FIG. 13 is a diagram showing experimental progress of ligation reaction (Taq DNA ligase) in vitro of a PCR product, wherein the sequence attached to the 0.74 kb double stranded fragment is SEQ ID NO: 31, the upper sequence attached to the 1.8 kb DNA segment is SEQ ID NO: 32, the sequence attached to the 1.0 kb double stranded fragment is SEQ ID NO: 33, and the lower sequence attached to the 1.8 kb DNA segment is SEQ ID NO: 33.

FIG. 14 is a diagram showing termination of chain extension reaction by using an oligonucleotide containing a chain extension termination caged analog (sequence TT, tBu type) as a template, wherein the primer attached to Fluorescein is SEQ ID NO: 7, the template 0T is SEQ ID NO: 19, the +4 primer is SEQ ID NO: 34, the tBu1T primer is SEQ ID NO: 28, the tBu2T modified primer is SEQ ID NO: 29, and the tBu3T modified primer is SEQ ID NO: 30.

FIG. 15 is a diagram showing termination of chain extension reaction by using an oligonucleotide containing a chain extension termination caged analog (sequence TT, adamantyl type) as a template, wherein the primer attached to Fluorescein is SEQ ID NO: 7, the template 0T is SEQ ID NO: 19, the +4 primer is SEQ ID NO: 34, the Ad1T primer is SEQ ID NO: 35, and the Ad2T primer is SEQ ID NO: 36.

FIG. 16 is a diagram showing termination of chain extension reaction by using an oligonucleotide containing a chain extension termination caged analog (sequences AA and TA, tBu type) as a template, wherein the primer attached to Fluorescein is SEQ ID NO: 7, the template Natural is SEQ ID NO: 19, the template +4 is SEQ ID NO: 34, the template tBuAA is SEQ ID NO: 37, and the template tBuAT is SEQ ID NO: 38.

FIG. 17 is a diagram showing termination of chain extension reaction by using an oligonucleotide containing a chain extension termination caged analog (sequences CC and GC, tBu type) as a template, wherein the primer attached to FAM is SEQ ID NO: 7, the template Natural is SEQ ID NO: 19, the template +4 is SEQ ID NO: 34, the template tBuCC is SEQ ID NO: 39, and the template tBuCG is SEQ ID NO: 40.

DESCRIPTION OF THE INVENTION

1. Primer

Hereinafter, the primer according to the present invention will be described. The primer according to the present invention is a primer used for amplifying a nucleic acid, and has a structure represented by the following formula (1):

[Chemical formula 7]

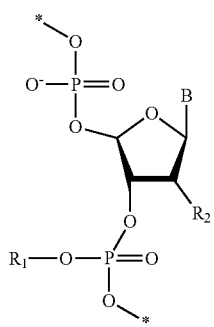

(1)

where, B represents a base, $R_1$ represents a decomposable protecting group, $R_2$ represents hydrogen or a hydroxyl group, and the symbol * represents a bond to a sugar of an adjacent nucleotide. In this regard, as to the bonds each represented by the symbol *, the bond on the 3'-end side of the formula (1) bonds to the 5' carbon of a sugar of an adjacent nucleotide on the 3'-end side, and the bond on the 5'-end side bonds to the 3' carbon of a sugar of an adjacent nucleotide on the 5'-end side. Further, in a case of a DNA primer, $R_2$ represents hydrogen, and in a case of a RNA primer, $R_1$ represents a hydroxyl group.

The B represents a base, and is specifically selected from adenine, guanine, cytosine, and thymine in a case of a DNA primer, and is selected from adenine, guanine, cytosine, and uracil in a case of a RNA primer.

The decomposable protecting group of $R_1$ means a protecting group (substituent) that is decomposed by some kind of treatment. Examples of the treatment referred to herein include photoirradiation treatment, reduction treatment, alkali treatment, acid treatment, oxidation treatment, desilylation treatment, heat treatment, esterase treatment, and phosphatase treatment. Since polymerase recognizes more strongly the negative charge of a phosphoric acid group of a nucleic acid, it is presumed that masking the phosphoric acid group with a protecting group as shown in the formula (1) can further enhance the termination efficiency of polymerase rather than introducing a protecting group into the base as in Patent Literature 1.

(1) Photodecomposable Protecting Group

In a case of photoirradiation treatment, it is preferable that $R_1$ is a photodecomposable protecting group represented by the following formula (2A):

[Chemical formula 8]

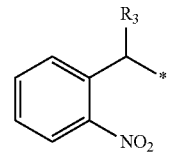

(2A)

where, $A_1$ represents an alkylene group having 1 to 3 carbon atoms, and may have a branched chain having 1 to 3 carbon atoms or a branched chain having 1 to 20 carbon atoms, and the symbol * represents a bond to oxygen (O) of phosphoric acid.

Examples of the alkylene group having 1 to 20 carbon atoms include a methylene group, an ethylene group, a propylene group, a tert-butyl group, a sec-butyl group, a cyclohexyl group, and an adamantyl group.

It is preferable that $R_1$ is a photodecomposable protecting group represented by the following formula (4A):

[Chemical formula 9]

(4A)

where $R_3$ represents an alkyl group having 1 to 20 carbon atoms.

In particular, it is preferable that $R_3$ is a bulky group such as a tert-butyl group, or an adamantyl group. As shown in Examples to be described later, the higher the bulkiness of $R_3$ is, the higher the chemical stability at a modified site and the inhibitory effect of replication reaction are. Accordingly, the number of carbon atoms of $R_3$ is 3 or more, preferably 4 or more, more preferably 7 or more, and particularly preferably 10 or more. In the substituents ($R_3$ is a methyl group, a tert-butyl group, or an adamantyl group) described in Examples, a methyl group<a tert-butyl group<an adamantyl group in ascending order of chemical stability is indicated.

As the $R_1$, a 2-nitrobenzyl group represented by the following formula (3A) can be mentioned.

[Chemical formula 10]

(3A)

(2) Reducing Agent-Decomposable Protecting Group

In a case of reduction treatment, it is preferable that $R_1$ is a reducing agent-decomposable protecting group represented by the following formula (2B):

[Chemical formula 11]

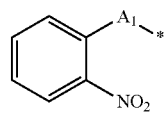

(2B)

where, $A_2$ represents an alkylene group having 1 to 3 carbon atoms, and may have a branched chain having 1 to 20 carbon atoms, and the symbol * represents a bond to oxygen (O) of phosphoric acid.

Examples of the alkylene group having 1 to 20 carbon atoms include a methylene group, an ethylene group, a propylene group, a tert-butyl group, a sec-butyl group, a cyclohexyl group, and an adamantyl group.

As the $R_1$, a 4-nitrobenzyl group represented by the following formula (3B) can be mentioned.

[Chemical formula 12]

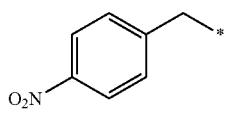

(3B)

(3) Other Decomposable Protecting Groups

Examples of the decomposable protecting group capable of being desorbed from the base to be modified by alkali treatment include an isobutyryl group, a benzoyl group, and an acetoxymethyl group. An example of the decomposable protecting group capable of being desorbed from the base to be modified by acid treatment includes a trityl group. Examples of the decomposable protecting group capable of being desorbed from the base to be modified by oxidation treatment include an allyloxymethyl group, a dimethoxybenzyloxymethyl group, and a trimethoxybenzyloxymethyl group. Examples of the decomposable protecting group capable of being desorbed from the base to be modified by desilylation treatment include a t-butyldimethoxysilyloxymethyl group, and a t-butyldiphenylsilyloxymethyl group. An example of the decomposable protecting group capable of being desorbed from the base to be modified by heat treatment includes an isocyanate group. An example of the decomposable protecting group capable of being desorbed from the base to be modified by esterase treatment includes an acetoxymethyl group. An example of the decomposable protecting group capable of being desorbed from the base to be modified by phosphatase treatment includes a methyl phosphate group.

The primer according to the present invention is particularly a single-stranded DNA or single-stranded RNA to be suitably used for PCR, and is an oligonucleotide or polynucleotide having a structure represented by the above formula (1). The number of base pairs of the primer may be appropriately set depending on, for example, the sequence of a target DNA or the like, and is generally 20 base pairs or less for an oligonucleotide and more than 20 base pairs for a polynucleotide. The upper limit of the number of base pairs of the polynucleotide is not particularly limited, and for example, 40 base pairs or less are preferable as a commonly used primer. Further, the lower limit of the number of base pairs of the oligonucleotide is not particularly limited as long as the oligonucleotide having such a lower limit of the number can be used as a primer, and for example, 5 base pairs or more are preferable as a commonly used primer.

In the primer, it is preferable that two or more structures each represented by the formula (1) are continuous rather than only the one structure is in a sequence. In a case of only the one structure of the formula (1) in a sequence, a sticky end cannot be formed if the replication of DNA by DNA polymerase is not terminated at the structural part. However, when two or more structures of the formula (1) are continuous, the replication of DNA is probabilistically easier to be terminated, and the efficiency of sticky end formation is increased.

2. Method for Producing Primer

The primer according to the present invention can be produced by synthesizing a modified nucleotide having a structure represented by the above formula (1) (hereinafter, also referred to as "nucleotide derivative"), and then ligating an unmodified nucleotide to the above modified nucleotide by a solid-phase synthesis method such as a phosphoramidite method.

As the outline of the method for synthesizing a primer, first, the 5'-hydroxyl group of a nucleoside is protected, and then N,N-bis(diisopropylamino)chlorophosphine is reacted with the 3'-hydroxyl group. Next, nitrobenzyl alcohol is reacted to introduce a decomposable protecting group. After that, a phosphoramidite or the like is reacted, and an unmodified nucleotide is ligated by a solid-phase synthesis method to synthesize a primer. Hereinafter, specific methods for producing the primers disclosed in Examples will be described.

(a) Synthesis of nucleoside derivative having reducing agent-decomposable protecting group (X compound in which $R_1$ represents the formula (2B), and $R_2$ represents hydrogen, in the formula (1)) and of primer

[Chemical formula 13]

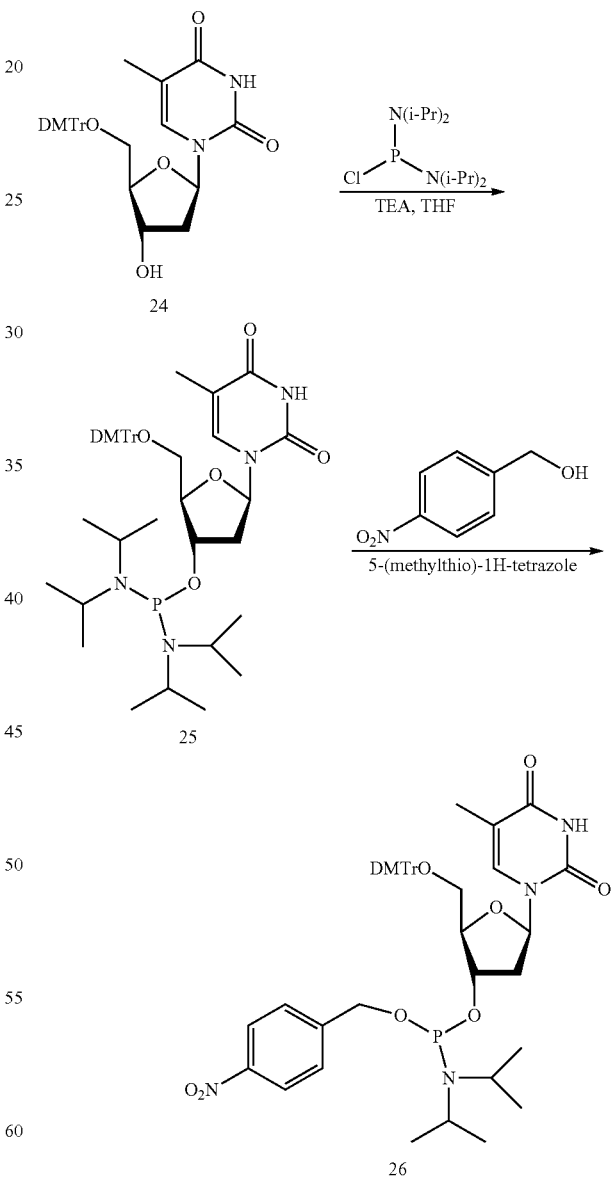

The synthesis will be described in accordance with the above synthetic scheme. In the synthetic scheme to be described below, the number represents the number of a compound. First, a deoxyribonucleoside (thymidine in the following scheme) is prepared as a starting material. Into the starting material, 4,4'-dimethoxytrityl chloride (DMTrCl) and pyridine were added, and a 4,4'-dimethoxytrityl chloride group is bonded to the 5'-hydroxyl group of the ribose (compound 24). Next, N,N-bis(diisopropylamino)chlorophosphine is added to triethylamine (TEA), and tetrahydrofuran (THF), and a phosphoramidite is bonded to the 3'-hydroxyl group of the deoxyribose (compound 25). Next, 4-nitrobenzyl alcohol is added into the reaction mixture, and then 5-(methylthio)-1H-tetrazole is added to the mixture, and a compound 26 is obtained. After that, by a routine procedure, the nucleotides are solid-phase synthesized so that a desired sequence is obtained, and thus a primer is synthesized.

3. Method for and Device for Producing Double-Stranded DNA Having Sticky Ends

Next, a method for and a device for producing double-stranded DNA having sticky ends will be described. The device for producing double-stranded DNA according to the present invention is a device for providing sticky ends by using the primer according to the present invention. Further, the method for producing double-stranded DNA according to the present invention is a method for providing sticky ends by using the primer according to the present invention with the use of a template DNA containing a target DNA sequence. Hereinafter, the method and the device will be described with reference to FIG. 1. In addition, in the present embodiment, a primer in which two structures of the formula (1) are continuous is used, but a primer in which only the one structure of the formula (1) can also use a similar method and a similar device.

First, a primer set for PCR amplification containing a forward primer and a reverse primer as reagents is prepared (preparation step). The forward primer is complementary to a part of a sequence of the antisense strand of the template DNA, and has a structure represented by the formula (1). Further, the reverse primer is complementary to a part of a sequence of the sense strand of the template DNA, and has a structure represented by the formula (1).

As shown in (a) of the diagram, the forward primer and the reverse primer are sequenced so as to sandwich the target DNA sequence to be amplified. Further, the primer is designed so that the position of a nucleotide having a decomposable protecting group of the formula (1) in the primer is a position complementary to the position adjacent to the 3'-end side of the nucleotide on the most 3'-end side on the 3'-recessed side in the sequence of the sticky end to be targeted ((c) in the diagram). In a case where two or more structures of the formula (1) are continuous, a nucleotide at a position on the most 3'-end side among the nucleotides having a structure of the formula (1) is set to be the above position. Other reagents include polymerase (such as Taq polymerase) used for PCR, a buffer, and a dNTP.

Next, the sequence of a template DNA is amplified by using a PCR device (amplification unit) (amplification step). In the PCR device, multiple cycles of polymerase chain reaction (PCR) are performed by using a template DNA as the template, a forward-side extended chain in which the forward primer is extended, and a reverse-side extended chain in which the reverse primer is extended are formed, the forward-side extended chain and the reverse-side extended chain are annealed, and double-stranded DNA with 3'-recessed ends ((b) in the diagram) is formed.

In the PCR, the sequence of a template DNA is amplified by repeating thermal denaturation, annealing, and extension reaction. Although depending on the PCR conditions, the thermal denaturation is performed at around 95° C. for 1 to 3 minutes, the annealing is performed at a temperature of the primer±5° C., and the extension reaction is performed for 1 to 10 minutes. The number of PCR cycles is not particularly limited, and in general, around 24 to 40.

As shown in the diagram, double-stranded DNA with 3'-recessed ends is contained in the PCR amplification product. This is because the decomposable protecting group of the formula (1) inhibits the polymerase reaction and terminates the reaction when the complementary strand is synthesized by using a primer as the template.

After that, as shown in (c) of the diagram, $R_1$ is deprotected by a predetermined treatment, and a sticky end with a 5'-protruding end is formed (deprotection step). The predetermined treatment is a treatment for deprotecting $R_1$, and examples of the treatment include the above-described photoirradiation treatment, and reduction treatment.

Hereinafter, the deprotection mechanism will be described. As shown in the following formula, when a predetermined treatment is applied, the decomposable protecting group $R_1$ of the formula (1) is desorbed from the phosphoric acid of a nucleotide.

[Chemical formula 14]

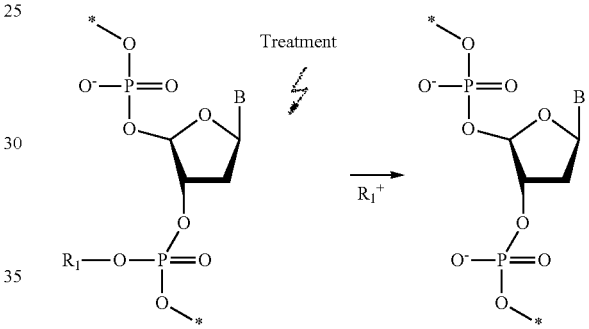

As the photoirradiation treatment, for example, a method of irradiation with light at a wavelength of 300 to 400 nm for 1 to 30 minutes by a light source device (deprotection unit) can be mentioned. Further, as the reduction treatment, for example, a method of performing the treatment, for example, at 70 to 80° C. for 1 to 30 minutes by using a reducing agent such as sodium dithionite ($Na_2S_2O_4$) can be mentioned. In this way, the decomposable protecting group of a nucleoside of the formula (1) of a primer is deprotected, and double-stranded DNA having 5'-protruding ends (3'-recessed ends) can be synthesized. Similarly, also in other treatments, the deprotection is performed by using a device for deprotecting a decomposable protecting group (deprotection device).

In the present invention, the sticky end can be freely designed without using a restriction enzyme or the like, and thus DNA having a desired sequence can be freely ligated. For example, both of the sequences of a target DNA and a vector are designed, a sticky end common to both of the sequences is formed by deprotection treatment, the ligation is performed to prepare recombinant DNA, and the prepared recombinant DNA can be used for cloning, library preparation, construction of a mass expression system, or the like. Further, by ligating multiple genome sequences having sticky ends, genome build-up reaction can be performed in vitro. Alternatively, by introducing double-stranded DNA in a blunt-end state into a cell and performing deprotection treatment in the cell, genome build-up reaction can also be performed in the cell.

EXAMPLES

Hereinafter, the present invention will be specifically described by way of Examples, but these Examples do not limit the object of the present invention. Further, in the following Examples, the expression "%" is on a mass basis (mass percent) unless otherwise particularly specified.

1. Chain Extension Termination Caged Analog T*

(1) Synthesis of Oligonucleotide Containing Chain Extension Termination Caged Analog T*

An oligonucleotide containing a chain extension termination caged analog T* (Table 1) was synthesized by a nucleic acid automatic synthesizer (NR-2A 7MX, manufactured by NIHON TECHNO SERVICE CO., LTD.) on the basis of a phosphoramidite method. An amidite compound of chain extension termination caged analog T* (chemical formula 13) was synthesized in accordance with a previous report (Wu, L. et al., Chem. Eur. J. 2014, 20, 12114-12122). A commercially available amidite reagent, 5'-Phosphate-ON Reagent (manufactured by ChemGenes Corporation) was used for the phosphorylation at the 5' end. The oligonucleotide after synthesis was deprotected in accordance with a conventional method, and then purified by reversed-phase HPLC [system: LaChrom Elite manufactured by Hitachi High-Tech Science Corporation, column: Hydrosphere C18 (250×10 mm I.D.) manufactured by YMC CO., LTD., eluent A: 50 mM triethylammonium acetate containing 5% acetonitrile (pH 7.0), eluent B: acetonitrile, gradient condition: 0 to 60% eluent B/20 min, eluent amount: 3 mL/min, and detection: performed by absorbance at a wavelength of 260 nm] (FIG. 2).

[Chemical formula 15]

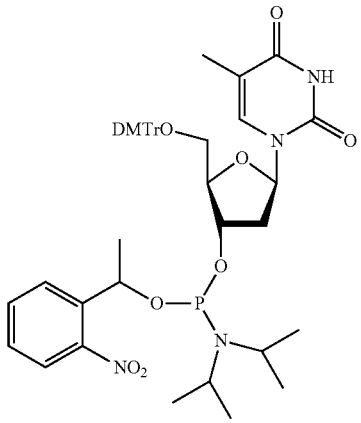

Synthesized oligonucleotide sequences each containing a chain extension termination caged analog T* are shown in the following Table. The p indicates that the hydroxyl group at the 5' end is phosphorylated.

TABLE 1

| Sequence Name | Sequence |
|---|---|
| 1T | 5'-ACGACTCACT*ATAGGGCGAATTCGAGCTCGGT-3' (SEQ ID NO: 1) |
| 2T | 5'-ACGACTCAT*T*ATAGGGCGAATTCGAGCTCGGT-3' (SEQ ID NO: 2) |
| pAcGFP_Fw2 | 5'-pAAAGAAGGAGAT*T*AACCATGGTGAGCAAGGGCGCC-3' (SEQ ID NO: 3) |
| pAcGFP_Rev2 | 5'-pAAGCAGCCGGT*T*CTCACTTGTACAGCTCATCCAT-3' (SEQ ID NO: 4) |
| pET21d_Fw2 | 5'-pAACCGGCTGCT*T*CCAAAGCCCGAAAGGAA-3' (SEQ ID NO: 5) |
| pET21d_Rev2 | 5'-pAATCTCCTTCTT*T*AAGTTAAACAAAATTATTTCTAGAG-3' (SEQ ID NO: 6) |

FIG. 2 shows chromatograms of (a) after deprotection and (b) after purification in synthesis of an oligonucleotide pAcGFP_Fw2. The peak in the vicinity of 14.1 minutes shown in chromatogram (a) before purification is a peak derived from the target product. This was fractionated and purified (b).

(2) Replication Reaction Using Oligonucleotide Containing Chain Extension Termination Caged Analog T* as Template Q5 (registered trademark) High-Fidelity DNA polymerase, Deep Vent (registered trademark) DNA polymerase, and Phusion (registered trademark) High-Fidelity DNA polymerase were purchased from New England Biolabs, Inc. Pfu DNA polymerase was purchased from Promega Corporation. A reaction mixture of enzyme reaction [containing 1 µM Primer (5' Fluorescein-ACCGAGCTCGAATTCGCC 3'(SEQ ID NO: 7)), 1 µM Template (0T, 1T or 2T, Table 1), 0.2 mM dNTPs, and 0.02 units/µL polymerase] was prepared in accordance with recommended conditions by using a buffer solution attached to each enzyme. The reaction mixture was heated at 95° C. for 1 minute, 55° C. for 30 seconds, and then 72° C. for 10, 30 or 60 minutes by Applied Biosystems 2720 Thermal Cycler. Into 10 µL of the reaction mixture after heating, 10 µL of 2× formamide loading solution was added, and the obtained mixture was heated at 90° C. for 3 minutes, and then analyzed by 20% denaturing PAGE containing 7.5 M urea (FIG. 3). The oligonucleotide chain contained in the gel after electrophoresis was detected by ChemiDoc XRS+Imaging System on the basis of the fluorescence derived from a fluorescein group modified at the 5' end of the primer chain.

FIG. 3 is a diagram showing termination of chain extension reaction by using an oligonucleotide containing a chain extension termination caged analog T* as a template. (a) shows sequences of the oligonucleotides used. (b) to (e) each show the results of denaturing PAGE analysis of the chain extension reaction using commercially available thermoresistant polymerase, and (f) shows the results of MALDI-TOF molecular weight analysis of the reaction by using 2T as a template and using Pfu DNA polymerase. The lower panel shows the analysis result (control experiment) of a raw material (primer).

The molecular weight analysis of the chain extension product shown in FIG. 3(f) was performed as follows. Under the above-described conditions, an enzyme reaction using 2T as a template and containing Pfu DNA polymerase was prepared, and the heating was performed at 95° C. for 1 minute, 55° C. for 30 seconds, and then 72° C. for 40 minutes. The reaction mixture (50 µL) was extracted with a mixture of TE saturated phenol and chloroform in equal amounts, and DNA was recovered by alcohol precipitation in the presence of ammonium acetate salt. The MALDI-TOF molecular weight analysis was performed by using a mass spectrometer ultrafleXtreme (Bruker Daltonics).

(3) Cloning Reaction Utilizing Sticky End Formation by Chain Extension Termination FIG. 5 shows a schematic diagram of ligation reaction of PCR fragment. The PCR fragments were ligated by the method shown in this diagram. First, the vector-side fragment (5.3 kb) was prepared as follows (FIG. 4(a)). A reaction mixture [0.5 µM pET21d_Fw2, 0.5 µM pET21d_Rev2, 0.8 ng/µL pET21d (Novagen), 20 mM Tris-HCl (pH 8.8 at 25° C.), 10 mM KCl, 10 mM (NH$_4$)$_2$SO$_4$, 2 mM MgSO$_4$, 0.1% Triton (registered trademark) X-100, 0.1 mg/mL BSA, 0.2 mM dNTPs, and 0.02 U/µL Pfu DNA polymerase] was subjected to heating by Applied Biosystems MiniAmp Plus thermal cycler under the following condition [(95° C., 15 seconds→50° C., 30 seconds→72° C., 7.5 minutes)/cycle×30 cycles].

The insert-side fragment (0.75 kb) was prepared as follows (FIG. 4(b)). A reaction mixture [0.5 µM pAcGFP1_Fw2, 0.5 µM pAcGFP1_Rev2, 0.8 ng/µL pAcGFP1 (Takara), 20 mM Tris-HCl (pH 8.8 at 25° C.), 10 mM KCl, 10 mM (NH$_4$)$_2$SO$_4$, 2 mM MgSO$_4$, 0.1% Triton (registered trademark) X-100, 0.1 mg/mL BSA, 0.2 mM dNTPs, and 0.02 U/µL Pfu DNA polymerase] was subjected to heating by Applied Biosystems MiniAmp Plus thermal cycler under the following condition [(95° C., 15 seconds→55° C., 15 seconds→72° C., 1 minute)/cycle×30 cycles].

Into the reaction mixture (50 µL) after PCR reaction, a mixture (100 µL) of TE saturated phenol (NACALAI TESQUE, INC.) and chloroform in equal amounts was added, the obtained mixture was vigorously mixed, and then was centrifuged (14,000×g, for 3 minutes) to separate the water layer. Similarly, the reaction mixture was extracted with chloroform (100 µL), and then 5 µL of 3 M NaOAc (pH 5.2) and 60 µL of isopropyl alcohol were added into the water layer. After cooling at −30° C. for 1 hour, the mixture was centrifuged (20,000×g, for 20 minutes), and DNA was recovered as pellets. In order to decompose the template plasmid DNA of PCR reaction, two kinds of reaction products were each reacted with a restriction enzyme DpnI (TOYOBO CO., LTD.) at 37° C. for 1 hour (0.8 U/µL DpnI in 33 mM Tris-acetate (pH 7.9), 10 mM Mg(OAc)$_2$, 66 mM KOAc, 0.5 mM dithiothreitol, and reaction mixture amount: 20 µL). 80 µL of water was added into the above reaction mixture, then a mixture of TE saturated phenol and chloroform in equal amounts (100 µL) was added, and the obtained mixture was vigorously mixed, and then was centrifuged (14,000×g, for 3 minutes) to separate the water layer. Similarly, the reaction mixture was extracted with chloroform (100 µL), and then 10 µL of 3M NaOAc (pH 5.2) and 110 µL of isopropyl alcohol were added. After cooling at −30° C. for 1 hour, the mixture was centrifuged (20,000×g, for 20 minutes), and DNA was recovered as pellets. The DNA pellets were dissolved in water and analyzed by 0.8% Agarose S (Wako Pure Chemical Industries, Ltd.) containing agarose gel electrophoresis (GelRed, Wako Pure Chemical Industries, Ltd.), and the concentration of the contained target DNA was calculated as compared with the band intensity of a DNA size marker (Quick-Load Purple 1 kb Plus DNA Ladder, New England Biolabs) [vector DNA fragment (5 µL), 13 ng/µL; and insert DNA fragment (50 µL), 23 ng/µL].

5 µL of a mixture of the vector DNA fragment (26.5 ng) and the insert fragment (26.5 ng) was added to wells of a 96-multiwell plate, and irradiated with light at a wavelength of 365 nm at around 4 mW/cm$^2$ for 10 minutes by a photoirradiation device MAX-305 (Asahi Spectra Co., Ltd). The same solution was added to 25 µL of E. coli competent cell solution (NEB 5-alpha Competent E. coli (High Efficiency), New England Biolabs) to perform transformation. This mixture was applied on LB agar medium containing ampicillin sodium (50 µg/mL), and cultured at 37° C. overnight. 20 colonies out of the generated 476 colonies were selected and subjected to colony PCR, and the presence or absence of the target insertion into the vector was determined. The PCR reaction solution was analyzed by agarose gel electrophoresis, and it was found that 18 clones out of the 20 clones contain target ligation reaction products (PCR primer: 5' TAATACGACTCACTATAGGG 3' (SEQ ID NO: 8), 5' GCTAGTTATTGCTCAGCGG 3' (SEQ ID NO: 9), colony positive rate: 90%). For 10 clones of ligation reaction products, cells containing the clones were liquid cultured, and the plasmid DNA was extracted. By using two kinds of primer sequences (5' GGTGATGTCGGCGA-TATAGG 3'(SEQ ID NO: 10), and 5' GCCAATCCGGA-TATAGTTCCT 3' (SEQ ID NO: 11)), the sequence of the plasmid DNA obtained by a DNA sequencer ABI PRISM 3500xL Genetic Analyzer was analyzed. As a result of analyzing the four primer DNA-derived sites, two overlapping sites among the four sites, and the base sequence in the range sandwiched between these sites, a sequence as designed was contained and any mutation was not observed in all of the 10 clones.

FIG. 4 is a diagram showing agarose gel electrophoresis analysis of PCR reaction. Lane 1 shows a size marker, and lane 2 shows a reaction mixture. (a) shows the preparation of a vector-side fragment. (b) shows the preparation of an insert-side fragment.

2. Analog (T) Deprotected Under Reduction Conditions (1) Synthesis of Analog (T) Deprotected Under Reduction Conditions The synthetic scheme of an analog deprotected under reduction conditions (reduction deprotection analog) is shown below. Hereinafter, the procedure for synthesizing a reduction deprotection analog will be described in accordance with the synthetic scheme.

[Chemical formula 16]

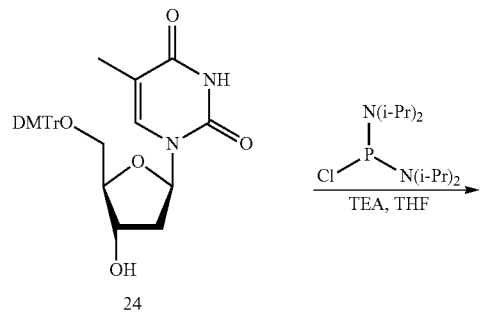

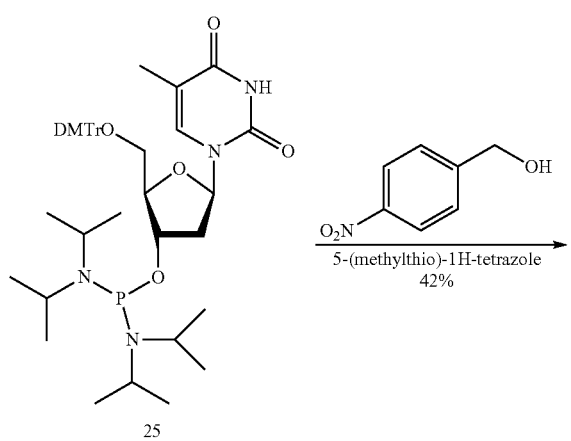

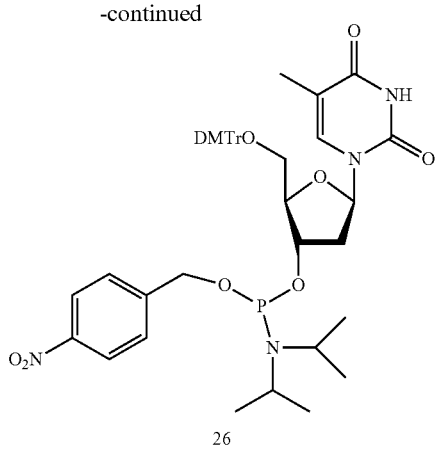

Synthesis of 3-O-[2-(4-nitrobenzyl oxy) (diisopropylamino)phosphanyl]-5-O-(4,4'-dimethoxytrityl)-2-deoxy-thymidine (Compound 26)

N,N-bis(diisopropylamino)chlorophosphine (0.39 g, 1.45 mmol) was added at room temperature into a mixture of a compound 24 (0.50 g, 1.32 mmol) and $Et_3N$ (200 μL, 1.45 mmol) in THF (7 mL). The generated mixture was stirred at room temperature for 25 minutes until the reaction was completed (compound 25). The next step was continued without purification. 4-Nitrobenzyl alcohol (0.22 g, 1.45 mmol) was added into the reaction mixture, and then 5-(methylthio)-1H-tetrazole (0.17 g, 1.45 mmol) was added. The reaction was completed at room temperature in 20 minutes. The reaction mixture was diluted with EtOAc, and washed with saturated $NaHCO_3$, $H_2O$, and brine. After evaporation, the mixture was purified by neutral flash silica gel chromatography (2% triethylamine/EtOAc=2:1 to 1:1 in hexane) to obtain a compound 26 (0.46 g, 0.56 mmol, 42%).

(2) Synthesis of Oligonucleotide

The amidite of the synthesized cleavage analog T** was set to an acetonitrile solution at a final concentration of 50 mM, and a DNA oligomer was synthesized by using a DNA synthesizer on the basis of a phosphoramidite method. The deprotection was performed in accordance with a conventional method, the DNA oligomer was purified by reversed-phase HPLC [LaChrom Elite manufactured by Hitachi High-Tech Science Corporation, column: Hydrosphere C18 (250×10 mm) manufactured by YMC CO., LTD.], and the structure was confirmed by using MALDI-TOF/MS (Bruker). The sequences of the synthesized DNAs are shown in the following Table.

TABLE 2

| Sequence Name | Sequence |
|---|---|
| 0T | 5'-ACGACTCACTATAGGGCGAATTCGAGCTCGGT-3' (SEQ ID NO: 12) |
| 1T | 5'-ACGACTCACT**ATAGGGCGAATTCGAGCTCGGT-3' (SEQ ID NO: 13) |
| 2T | 5'-ACGACTCACTTTAGGGCGAATTCGAGCTCGGT-3' (SEQ ID NO: 14) |

(3) Primer Extension Experiment

Q5 High-Fidelity DNA polymerase was purchased from New England Biolabs, Inc. Pfu DNA polymerase was purchased from Promega Corporation. A reaction mixture of enzyme reaction [containing 1 µM Primer (5' Fluorescein-ACCGAGCTCGAATTCGCC 3' (SEQ ID NO: 7)), 1 µM Template (0T, 1T or 2T, Table 2), 0.2 mM dNTPs, and 0.02 units/µL polymerase] was prepared in accordance with recommended conditions by using a buffer solution attached to each enzyme. The reaction mixture was heated at 95° C. for 1 minute, 55° C. for 30 seconds, and then 72° C. for 10, 30 or 60 minutes by Applied Biosystems 2720 Thermal Cycler. Into 9 µL of the reaction mixture after heating, 9 µL of 2× formamide loading solution was added, and the obtained mixture was heated at 90° C. for 3 minutes, and then analyzed by 20% denaturing PAGE containing 7.5 M urea (FIG. 6). The oligonucleotide chain contained in the gel after electrophoresis was detected by ChemiDoc XRS+Imaging System on the basis of the fluorescence derived from a fluorescein group modified at the 5' end of the primer chain.

(4) Deprotection Reaction of Oligonucleotide Containing One T** (1T)

An oligonucleotide (5'-ACGACTCACT**ATAGGGCGAATTCGAGCTCGGT-3' (SEQ ID NO: 13), 10 µM) was dissolved in 20 mM Tris-HCl (pH 7.4), $Na_2S_2O_4$ was added into the mixture so as to be a final concentration of 1 mM, and the obtained mixture was left to stand at room temperature for 30 minutes. After that, the progress of deprotection reaction was analyzed by reversed-phase HPLC [LaChrom Elite manufactured by Hitachi High-Tech Science Corporation, column: Hydrosphere C18 (250×10 mm) manufactured by YMC CO., LTD.] (FIG. 7).

(5) Deprotection Reaction of Oligonucleotide Containing Two T** (2T)

An oligonucleotide (5'-ACGACTCACTTTAGGGCGAATTCGAGCTCGGT-3' (SEQ ID NO: 14), 10 µM) was dissolved in 20 mM Tris-HCl (pH 7.4), $Na_2S_2O_4$ was added into the mixture so as to be a final concentration of 10 mM, and the obtained mixture was left to stand at room temperature for 30 minutes. After that, the progress of deprotection reaction was analyzed by reversed-phase HPLC [LaChrom Elite manufactured by Hitachi High-Tech Science Corporation, column: Hydrosphere C18 (250×10 mm) manufactured by YMC CO., LTD.] (FIG. 8).

3. Experiment in which Substituent R in Phosphoric Acid Modifying Group is Made Bulkier Hereinafter, when the substituent R in a phosphoric acid modifying group is made bulkier in a PCR termination primer, the chemical stability at a modified site and the inhibitory effect of replication reaction were evaluated. FIG. 9 is a diagram showing the outline of the experiment.

(1) Synthesis of Amidite Reagent (dT, R=Me, tBu, or Adamantyl)

By making the substituent R bulkier, an amidite reagent was designed to obtain the inhibitory effect of replication reaction and to improve the chemical stability.

(1-1) Synthesis of Methyl-Type dT Phosphoramidite

[Chemical formula 17]

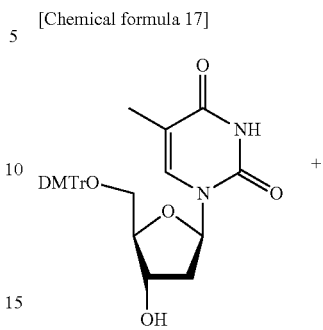

+

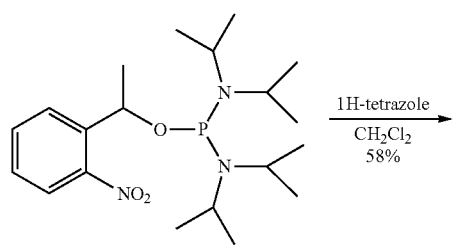

1H-tetrazole
$CH_2Cl_2$
58%

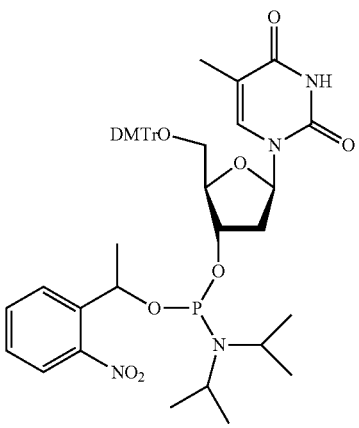

Refer to Chem. Eur. J. 2014, 20, 12114-12122

A photoprotective amidite reagent (300 mg, 0.75 mmol) and 1H-tetrazole (53 mg, 0.75 mmol) were added at 0° C. into a suspension of 5'-DMTr-thymidine (343 mg, 0.63 mg) in $CH_2Cl_2$ (1.7 mL) under argon, and the mixture was stirred at room temperature for 4 hours. This mixture was directly applied to a silica gel column ($CH_2Cl_2$/AcOEt=3/1 containing 3% TEA) to obtain a crude product. The crude product was purified by silica gel column chromatography (Hex/AcOEt=3/1 containing 3% TEA) to obtain Me analog amidite (309 mg, 58%).

$^{31}$P-NMR (159 MHz, CDCl3): δ148.8, 147.8, 147.7; HR-ESI-MS (m/z) calcd. 863.3392 [M+Na]$^+$, found 863.3415.

(1-2) Synthesis of Adamantyl-Type dT Phosphoramidite

[Chemical formula 18]

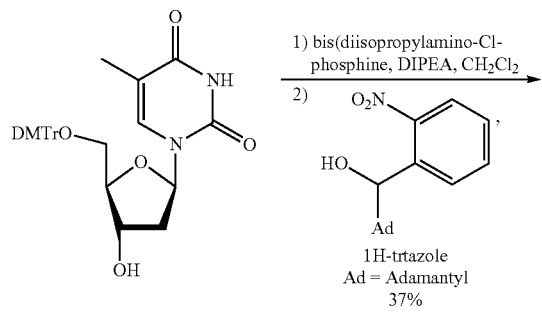

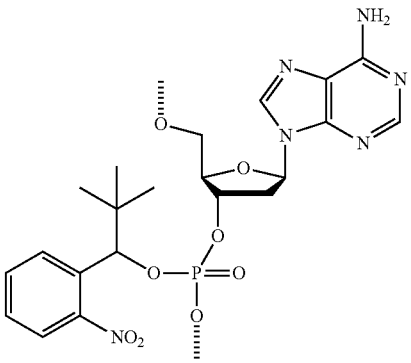

DIPEA (107 µL, 0.61 mmol) and bis(diisopropylamino)-Cl-phosphine (163 mg, 0.61 mmol) were added at 0° C. into a solution of 5'-DMTr-thymidine (258 mg, 0.47 mmol) in $CH_2Cl_2$ (4 mL) under argon, and the mixture was stirred at room temperature for 2 hours. Next, 2-nitro-α-adamantyl benzyl alcohol (150 mg, 0.52 mmol) and 1H-tetrazole (50 mg, 0.71 mmol) were added into the above reaction mixture, and the obtained mixture was stirred at room temperature for 2 hours. 1H-tetrazole (50 mg, 0.71 mmol) was added into the reaction mixture, and the obtained mixture was further stirred for 1 hour. After the addition of $H_2O$, the reaction mixture was extracted with AcOEt, and the washing with brine, the drying over $Na_2SO_4$, and the evaporation were performed. The crude product was purified by silica gel column chromatography (Hex/AcOEt=1/1 containing 0.5% TEA) to obtain Ad analog amidite (169 mg, 37%).

$^{31}$P-NMR (159 MHz, CDCl3): δ153.1, 151.9, 150.2, 148.1; HR-ESI-MS (m/z) calcd. 983.4331 [M+Na]$^+$, found 983.4336.

(1-3) Amidite Reagent Synthetic Scheme of Four Kinds of Bases (A, G, C, and T) of tBu-Substituted Analog (Summary)

Hereinafter, the outline of the synthetic scheme of an amidite reagent in a case where four kinds of bases are used is shown.

[Chemical formula 19]

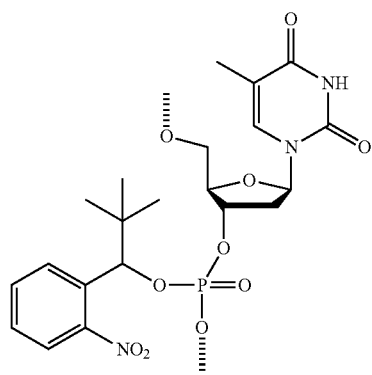

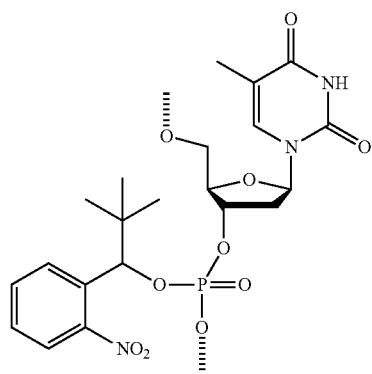

t-Butyl

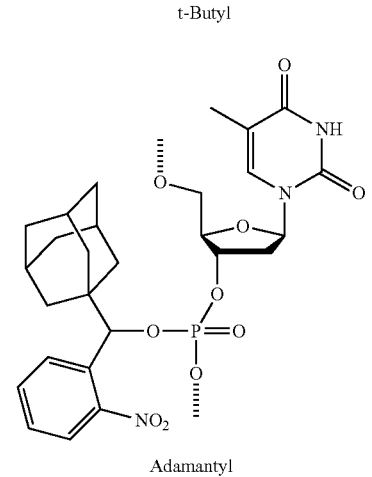

Adamantyl

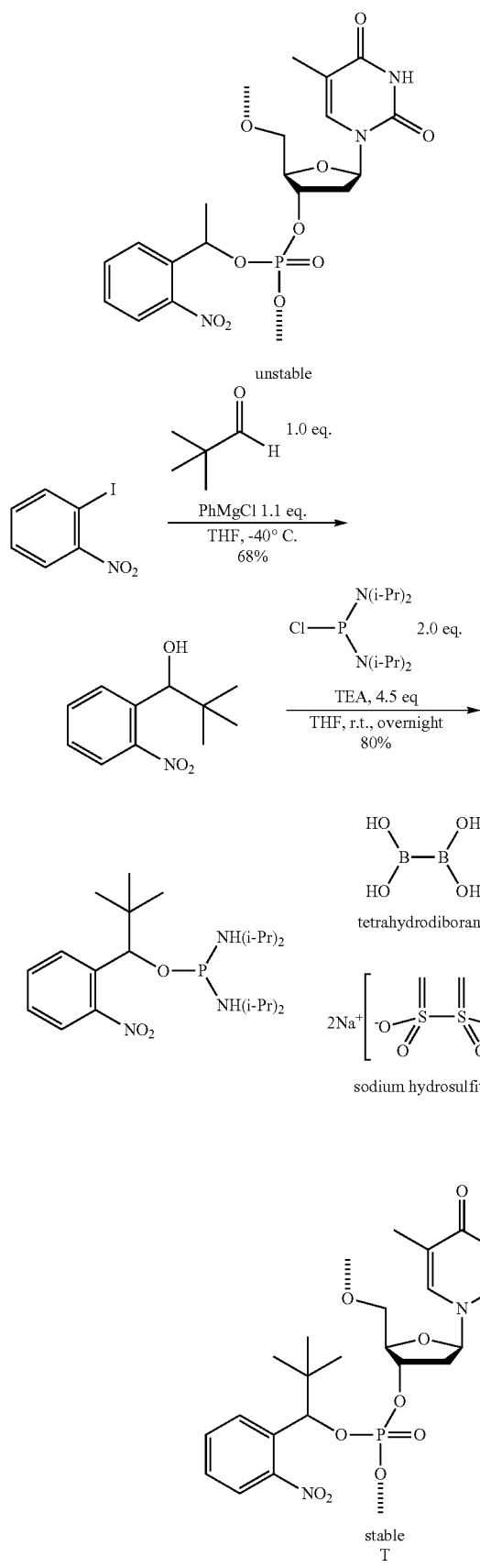
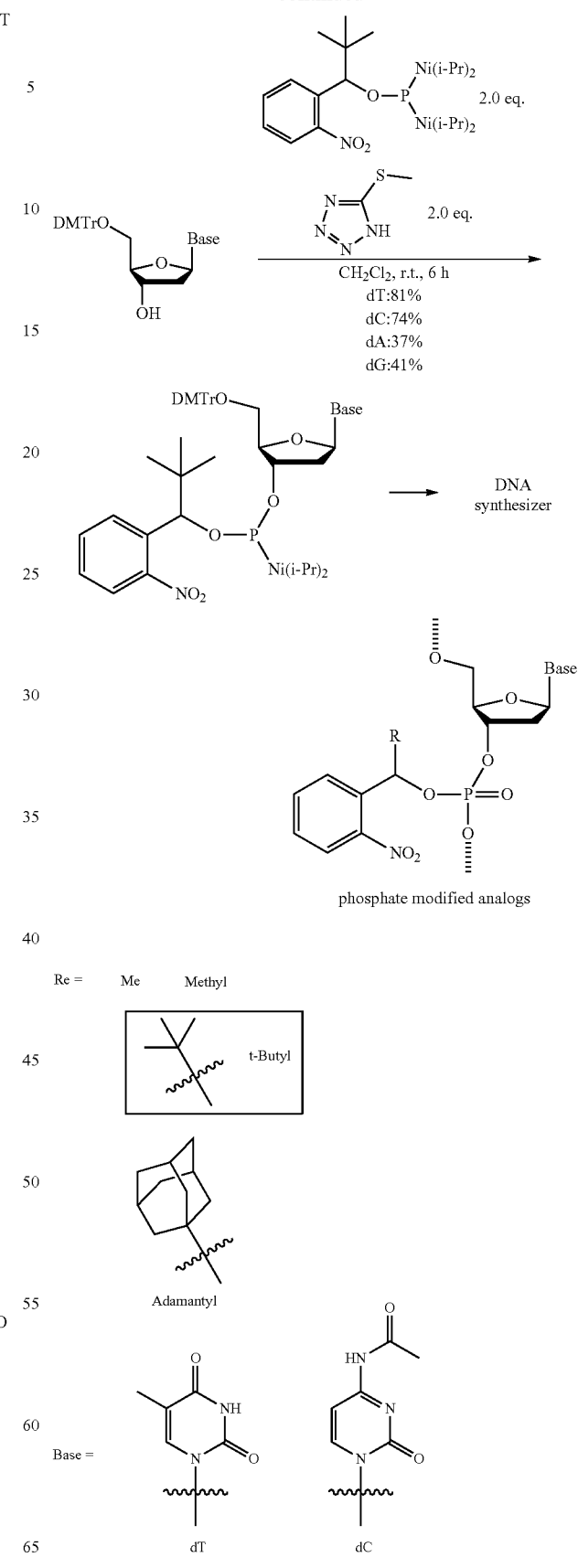

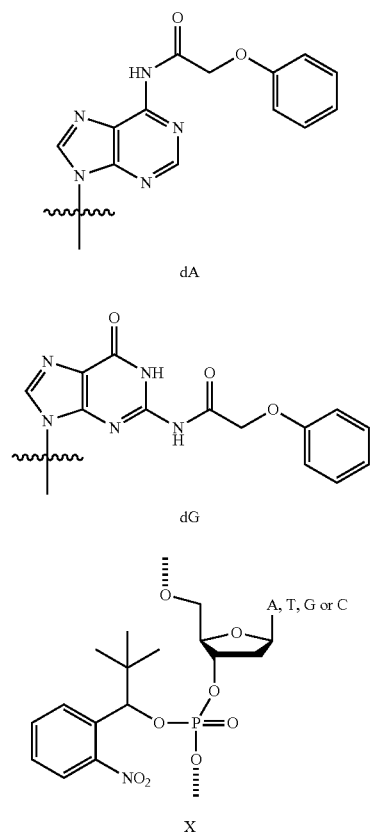

dA dG

X (1-4) Synthesis of Pac-dA Phosphoramidite

[Chemical formula 20]

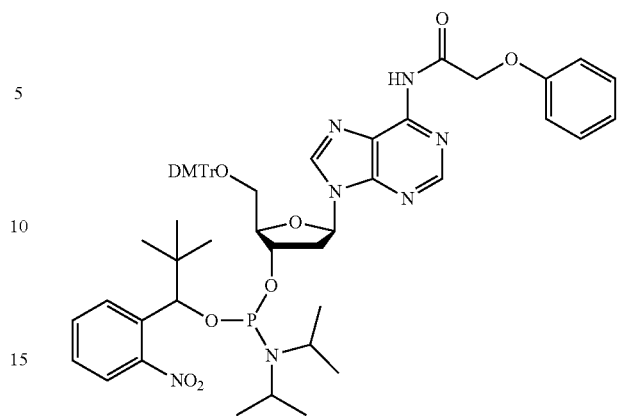

A photoprotective amidite reagent (2.6 g, 5.8 mmol) and 5(methylthio)-1H-tetrazole (1.0 g, 8.7 mmol) were added at 0° C. into a suspension of 5'-DMTr-Pac-dA (2.0 g, 2.9 mmol) in $CH_2Cl_2$ (7.5 mL) under argon, and the mixture was stirred at room temperature for 6 hours. The resultant mixture was poured into AcOEt (200 mL), and the washing with water (200 mL), saturated sodium hydrogen carbonate water (200 mL), and saline (200 mL) was performed. The organic phase was dried over sodium sulfate, filtered, and purified by silica gel column chromatography (Hex/AcOEt=2/1 containing 1% TEA) to obtain t-Bu dT analog amidite (1.1 g, 37%).

HR-ESI-MS (m/z) calcd. 1048.4350 [M+Na]$^+$, found 1048.4437.

(1-5) Synthesis of dT Phosphoramidite

[Chemical formula 21]

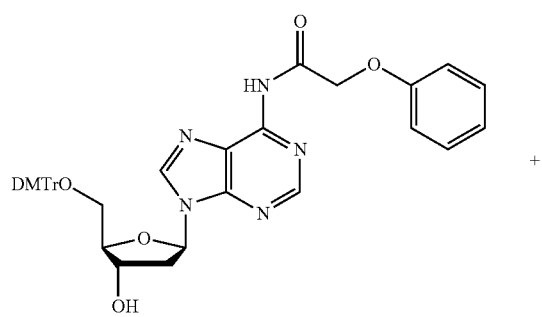

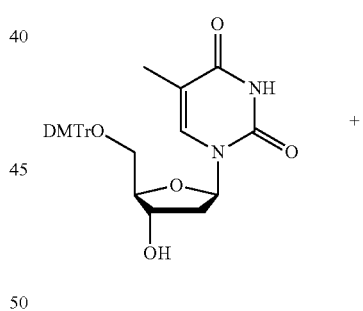

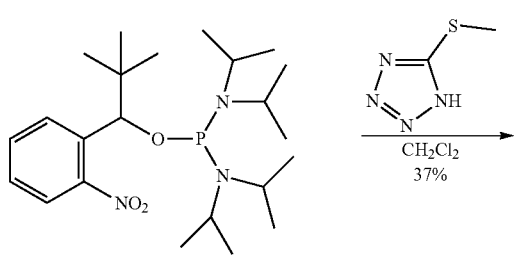

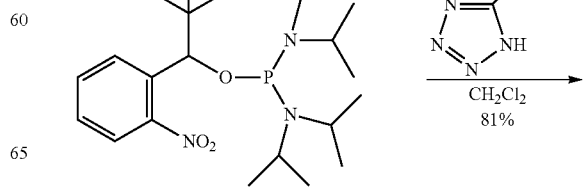

-continued

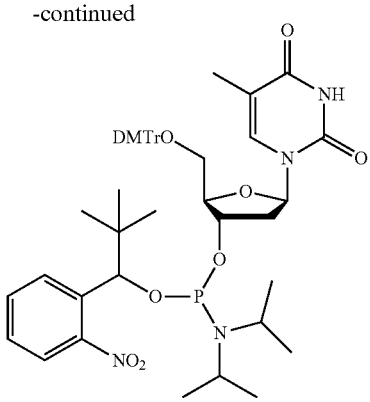

A photoprotective amidite reagent (2.4 g, 5.5 mmol) and 5-(methylthio)-1H-tetrazole (0.64 g, 5.5 mmol) were added at 0° C. into a suspension of 5'-DMTr-Pac-dA (1.5 g, 2.8 mmol) in $CH_2Cl_2$ (10 mL) under argon, and the mixture was stirred at room temperature for 7 hours. The resultant mixture was poured into AcOEt (200 mL), and the washing with water (200 mL), saturated sodium hydrogen carbonate water (200 mL), and saline (200 mL) was performed. The organic phase was dried over sodium sulfate, filtered, and purified by silica gel column chromatography (Hex/AcOEt=2/1 containing 1% TEA) to obtain t-Bu dA analog amidite (2.0 g, 81%).

HR-ESI-MS (m/z) calcd. 905.2267 [M+Na]+, found 905.3978.

(1-6) Synthesis of Pac-dG Phosphoramidite

[Chemical formula 22]

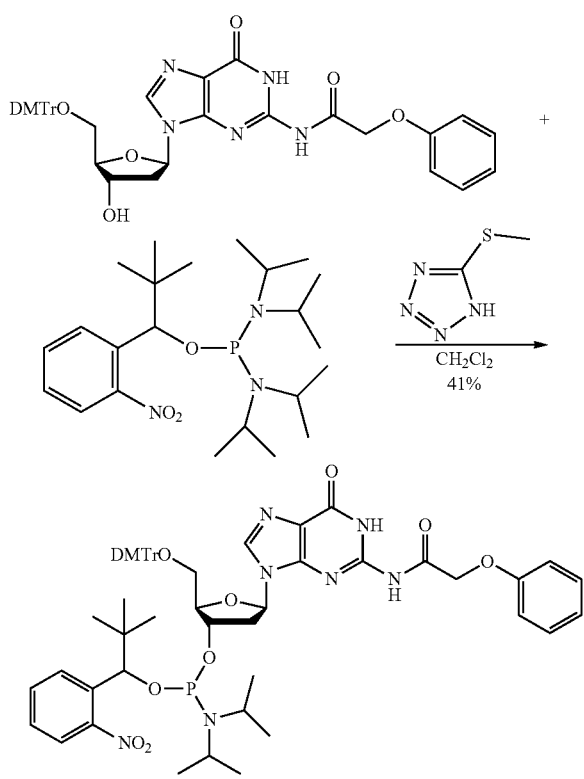

A photoprotective amidite reagent (2.5 g, 5.7 mmol) and 5-(methylthio)-1H-tetrazole (0.99 g, 8.5 mmol) were added at 0° C. into a suspension of 5'-DMTr-Pac-dG (2.0 g, 2.8 mmol) in $CH_2Cl_2$ (7.5 mL) under argon, and the mixture was stirred at room temperature for 6 hours. The resultant mixture was poured into AcOEt (200 mL), and the washing with water (200 mL), saturated sodium hydrogen carbonate water (200 mL), and saline (200 mL) was performed. The organic phase was dried over sodium sulfate, filtered, and purified by silica gel column chromatography (Hex/AcOEt=2/1 containing 1% TEA, AcOEt/MeOH=40/1) to obtain t-Bu dG analog amidite (1.2 g, 41%).

HR-ESI-MS (m/z) calcd. 1143.5678 [M+TEA]+, found 1143.5867.

(1-7) Synthesis of Ac-dC Phosphoramidite

[Chemical formula 23]

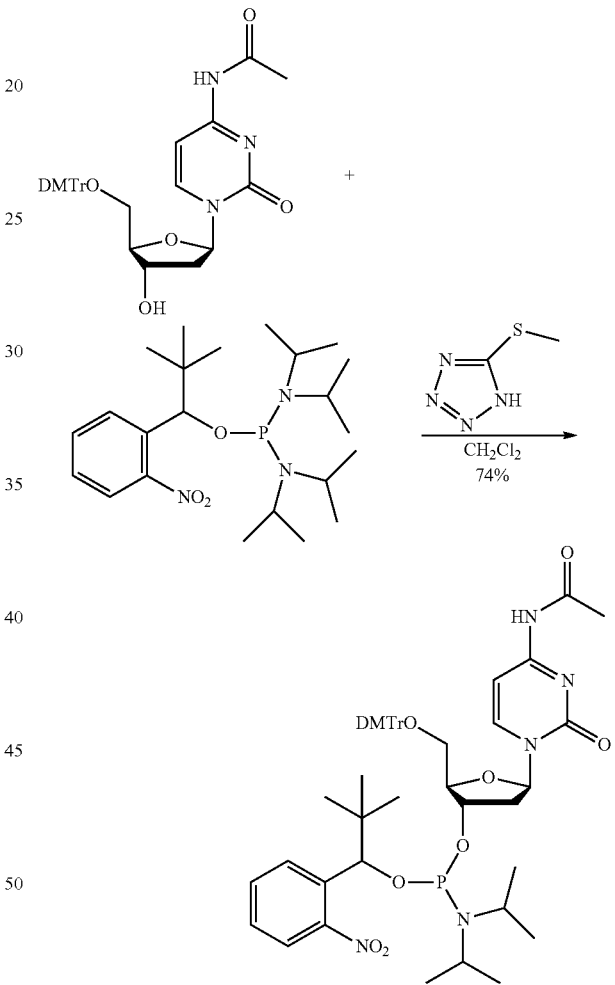

A photoprotective amidite reagent (2.8 g, 6.3 mmol) and 5(methylthio)-1H-tetrazole (0.73 mg, 6.3 mmol) were added at 0° C. into a suspension of 5'-DMTr-Ac-dC (1.8 g, 3.2 mmol) in $CH_2Cl_2$ (8.0 mL) under argon, and the mixture was stirred at room temperature for 6 hours. The resultant mixture was poured into AcOEt (200 mL), and the washing with water (200 mL), saturated sodium hydrogen carbonate water (200 mL), and saline (200 mL) was performed. The organic phase was dried over sodium sulfate, filtered, and purified by silica gel column chromatography (Hex/AcOEt=1/1 containing 1% TEA) to obtain t-Bu dC analog amidite (2.1 g, 74%).

HR-ESI-MS (m/z) calcd. 1011.5355 [M+TEA]$^+$, found 1011.5503.

(2) Stability (Decomposition Resistance) Test in Thermal Cycle Conditions (PCR Conditions) of Modified Oligonucleotide (Reaction Conditions)

10 μM oligo (Me1T or tBu1T) in 20 mM Tris-HCl, 10 mM $(NH_4)_2SO_4$, 10 mM KCl, 2 mM $MgSO_4$, and pH 8.8. The solution of the present composition was subjected to thermal cycle under the condition [(95° C., 1 minute→50° C., 30 seconds→72° C., 3 minutes)×30 cycles], and then the resultant solution was analyzed by reversed-phase HPLC.

(Analysis Conditions)

System: LaChrom Elite manufactured by Hitachi High-Tech Science Corporation

Column: Hydrosphere C18 (250×4.6 mm) manufactured by YMC CO., LTD.

Mobile phase: liquid A, 50 mM triethylammonium acetate containing 5% acetonitrile (TEAA, pH 7.0)

Liquid B, acetonitrile (Liquid B content was increased from 0% to 60% over 20 minutes (linear gradient))

Mobile phase flow rate: 1 mL/min

Detection wavelength: 260 nm (Results)

Desorption of a modified group was observed in around 50% of substrate after the oligonucleotide Me1T was subjected to the thermal cycle ((d) of FIG. 10: it was confirmed that the observed peak was matched with the elution time of the same oligonucleotide sequence without modification). On the other hand, in a case of tBu1T, the desorption of a protecting group was not observed even when the thermal cycle was performed ((e) of FIG. 10). Therefore, as a result of comparing the stability of Me-type modification with that of tBu-type modification, the latter indicated the superiority.

(3) Experiment Showing that the Modified Primer is Stable (Decomposition Resistance) Under PCR Conditions (Comparison Among Analog Introduction Numbers 1, 2, and 3 of tBu)

(Reaction Conditions)

10 μM oligo (tBu1T, tBu2T or tBu3T) in 20 mM Tris-HCl, 10 mM $(NH_4)_2SO_4$, mM KCl, 2 mM $MgSO_4$, and pH 8.8. The solution of the present composition was subjected to thermal cycle under the condition [(95° C., 1 minute→50° C., 30 seconds→72° C., 3 minutes)×30 cycles], and then the resultant solution was analyzed by reversed-phase HPLC.

(Analysis Conditions)

System: LaChrom Elite manufactured by Hitachi High-Tech Science Corporation

Column: Hydrosphere C18 (250×4.6 mm) manufactured by YMC CO., LTD.

Mobile phase: liquid A, 50 mM triethylammonium acetate containing 5% acetonitrile (TEAA, pH 7.0)

Liquid B, acetonitrile (Liquid B content was increased from 0% to 60% over 20 minutes (linear gradient))

Mobile phase flow rate: 1 mL/min

Detection wavelength: 260 nm (Results)

As shown in FIG. 11, the desorption of a protecting group was not observed under the present conditions even when the number of the introduced modifications was increased to 2 or 3.

(4) Reversed-Phase HPLC Analysis of Deprotection Reaction of tBu-Type Modified Primer (Deprotection Reaction Conditions)

Photoirradiation ((b) of FIG. 12): a solution of 10 μM oligo and 10 mM Tris-HCl (pH 8.5)
was irradiated with light at a wavelength of 365 nm (4 mW/cm$^2$) for 10 minutes Reduction reaction ((c) of FIG. 12): a solution of 5 μM oligo, 10 mM $Na_2S_2O_4$, and 20 mM Tris-HCl (pH 8.5)
was incubated at 25° C. for 30 minutes (Analysis Conditions)

System: LaChrom Elite manufactured by Hitachi High-Tech Science Corporation

Column: Hydrosphere C18 (250×4.6 mm) manufactured by YMC CO., LTD.

Mobile phase: liquid A, 50 mM triethylammonium acetate containing 5% acetonitrile (TEAA, pH 7.0)

Liquid B, acetonitrile (Liquid B content was increased from 0% to 60% over 20 minutes (linear gradient))

Mobile phase flow rate: 1 mL/min

Detection wavelength: 260 nm

It has been confirmed that the deprotection can be performed in a similar way also under the following conditions.
10 μM oligo, 10 mM $B_2(OH)_4$, 50 mM NaOH, 30% EtOH/water; 25° C., 2 hours
10 μM oligo, 1.5 mM $TiCl_3$, 20 mM citrate buffer (pH 6.0); 25° C., 2 hours As shown in FIG. 12, quantitative reaction progress was confirmed in both of the photoirradiation at a wavelength of 365 nm and the reduction reaction by sodium dithionite.

(5) Ligation Reaction of PCR Product In Vitro (Taq DNA Ligase)

By using the thermoresistant polymerase shown in FIG. 13, a double-stranded DNA fragment was prepared by PCR reaction. In the preparation of a 1.0 kb fragment, a pET21 plasmid DNA as a template, and the following two primer sequences were used.

The underlined portion T (T) indicates that a Me- or tBu-type modified group is contained in the phosphoric acid moiety. The p indicates that the 5' end is phosphorylated.

```
Fw (21-nt),
                                      (SEQ ID NO: 15)
5' CGCCGAGACAGAACTTAATGG 3'

Rev (38-nt),
                                      (SEQ ID NO: 16)
5' pAATCTCCTTCTTTAAGTTAAACAAAATTATTTCTAGAG 3'
```

In the preparation of a 0.74 kb fragment, a pAcGFP1 plasmid DNA as a template, and the following two primer sequences were used.

The underlined portion T (T) indicates that a Me- or tBu-type modified group is contained in the phosphoric acid moiety. The p indicates that the 5' end is phosphorylated.

```
Fw (35-nt),
                                      (SEQ ID NO: 17)
5' pAAAGAAGGAGATTAACCATGGTGAGCAAGGGCGCC 3'

Rev (34-nt),
                                      (SEQ ID NO: 18)
5' GCAACCAAGCTTCTCACTTGTACAGCTCATCCAT 3'
```

By using the commercially available thermoresistant polymerase shown in the diagram, the PCR reaction was performed in accordance with recommended conditions, and a 1.0 kb fragment and a 0.74 kb fragment were prepared. The progress of reaction was confirmed by 1.5% Agarose S (Wako Pure Chemical Industries, Ltd.) containing agarose gel electrophoresis (GelRed, Wako Pure Chemical Industries, Ltd). After the PCR reaction, 200 µL of a mixture of TE saturated phenol (NACALAI TESQUE, INC.) and chloroform in equal amounts was added into 200 µL of the reaction mixture, the obtained mixture was vigorously mixed, and then was centrifuged (20,000×g, for 1 minute) to separate the water layer. Similarly, the reaction mixture was extracted with 200 µL of chloroform, and then 20 µL of 3 M NaOAc (pH 5.2) and 220 µL of isopropyl alcohol were added. After cooling at −30° C. for 1 hour, the mixture was centrifuged (20,000×g, for 20 minutes), and DNA was recovered. The target DNA product was purified by 1.5% Agarose S (Wako Pure Chemical Industries, Ltd.) containing agarose gel electrophoresis (GelRed, Wako Pure Chemical Industries, Ltd). DNA was extracted from a cut-out gel piece by using Wizard SV Gel and PCR Clean-Up System (Promega).

The 1.0 kb fragment and the 0.74 kb fragment, which had prepared in this way, were ligated by using a Taq DNA ligase, and the efficiency was evaluated by agarose gel electrophoresis. First, in order to remove the protecting group in the phosphoric acid moiety, a DNA solution (5 µL, 24 nM 1.0 kb fragment, 24 nM 0.74 kb fragment, and 1 mM Tris-HCl (pH 8.5)) was irradiated with light at a wavelength of 365 nm at a light intensity of 4 mW/cm$^2$ for 5 minutes. Next, into the solution containing these two DNA fragments, a Taq DNA ligase (New England Biolabs) was added, and the obtained mixture was incubated at 37° C. for 2 hours. The composition of the reaction mixture was as follows. Into a reaction mixture of 2.8 nM 1.0 kb fragment, 2.8 nM 0.74 kb fragment, 1.6 U/µL Taq DNA ligase, 20 mM Tris-HCl, 25 mM potassium acetate, 10 mM magnesium acetate, 1 mM NAD 1, 10 mM DTT, and 0.1% Triton X-100, and pH 7.6, 80 µL of water was added, the whole amount was set to around 100 µL, further into the mixture, 100 µL of a mixture of TE saturated phenol (NACALAI TESQUE, INC.) and chloroform in equal amounts was added, and the obtained mixture was vigorously mixed, and then was centrifuged (20,000×g, for 1 minute) to separate the water layer. Similarly, the reaction mixture was extracted with 100 µL of chloroform, and then 10 µL of 3M NaOAc (pH 5.2), 110 µL of isopropyl alcohol, and 1 µL of 20 mg/mL glycogen were added. After cooling at −30° C. for 15 minutes, the mixture was centrifuged (20,000×g, for 20 minutes), and DNA was recovered. The recovered DNA product was electrophoresed by agarose gel electrophoresis (1.5% Agarose S (Wako Pure Chemical Industries, Ltd). The gel after the electrophoresis was stained with a GelRed aqueous solution to visualize the band (BioRad ChemiDoc XRS+ system).

As shown in the diagram, the Me and tBu primers were compared with each other, and it was confirmed that the latter one obtained the higher ligation efficiency.

(6) Replication Reaction Using Oligonucleotide Containing Chain Extension Termination Caged Analog as Template The experiment of replication reaction was performed in a similar manner as in the above "(2) Replication reaction using oligonucleotide containing chain extension termination caged analog T* as template".

A reaction mixture of enzyme reaction [containing 1 µM Primer (5' Fluorescein-ACCGAGCTCGAATTCGCC 3' (SEQ ID NO: 7)), 1 µM Template (the sequence and structure are shown in each diagram), 0.2 mM dNTPs, and 0.02 units/µL polymerase] was prepared in accordance with recommended conditions by using a buffer solution attached to each enzyme. The reaction mixture was heated at 95° C. for 1 minute, 55° C. for 30 seconds, and then 72° C. for 30 minutes by Applied Biosystems 2720 Thermal Cycler. Into 10 µL of the reaction mixture after heating, 10 µL of 2× formamide loading solution was added, and the obtained mixture was heated at 90° C. for 3 minutes, and then analyzed by 20% denaturing PAGE containing 7.5 M urea (FIGS. 14 to 17). The oligonucleotide chain contained in the gel after electrophoresis was detected by ChemiDoc XRS+ Imaging System on the basis of the fluorescence derived from a fluorescein group modified at the 5' end of the primer chain.

The invention claimed is:

1. A primer for amplifying a nucleic acid, having a structure represented by the following formula (1):

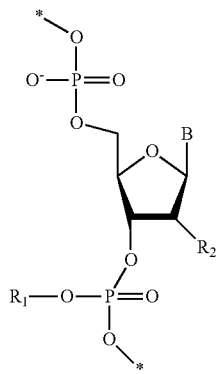

(1)

where B represents a base, $R_1$ represents a decomposable protecting group, $R_2$ represents hydrogen or a hydroxyl group, and a symbol * represents a bond to a sugar of an adjacent nucleotide, wherein the $R_1$ is a photodecomposable protecting group represented by the following formula (2A) or a reducing agent-decomposable protecting group represented by the following formula (2B):

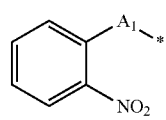

(2A)

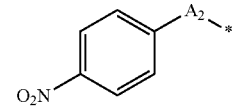

(2B)

where $A_1$ represents an alkylene group having 1 to 3 carbon atoms and may have a branched chain having 1 to 20 carbon atoms, and a symbol * of formula (2A) represents a bond to oxygen (O) of phosphoric acid, where $A_2$ represents an alkylene group having 1 to 3 carbon atoms and may have a branched chain having 1 to 20 carbon atoms, and a symbol * of formula (2B) represents a bond to oxygen (O) of phosphoric acid.

2. The primer according to claim 1, wherein the $R_1$ is a photodecomposable protecting group represented by the following formula (4A):

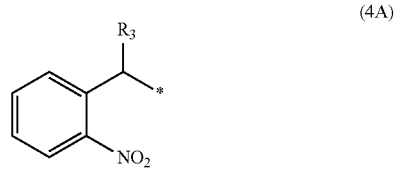

(4A)

where $R_3$ represents an alkyl group having 1 to 20 carbon atoms.

3. The primer according to claim 2, wherein the $R_3$ is a tert-butyl group or an adamantyl group.

4. The primer according to claim 1, wherein the $R_1$ is a 2-nitrobenzyl group represented by the following formula (3A):

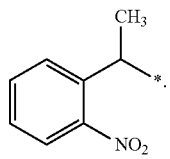
(3A)

5. The primer according to claim 1, wherein the $R_1$ is a 4-nitrobenzyl group represented by the following formula (3B):

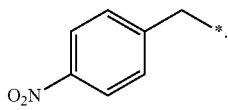
(3B)

6. The primer according to claim 1, wherein two or more structures each represented by the formula (1) are continuous in a sequence.

7. A device for producing double-stranded DNA having sticky ends by using the primer according to claim 1, comprising:
 a forward primer being complementary to a part of a sequence of an antisense strand of a template DNA to be used as a template and having a structure represented by formula (1);
 a reverse primer being complementary to a part of a sequence of a sense strand of the template DNA and having a structure represented by formula (1);
 an amplification unit for performing a plurality of cycles of polymerase chain reaction (PCR) by using the template DNA as a template to form a forward-side extended chain being the forward primer extended and a reverse-side extended chain being the reverse primer extended, and for annealing the forward-side extended chain and the reverse-side extended chain to form double-stranded DNA with 3'-recessed ends; and
 a deprotection unit for deprotecting the $R_1$.

8. A method for producing double-stranded DNA having sticky ends by using the primer according to claim 1, comprising:
 a preparation step of preparing a forward primer being complementary to a part of a sequence of an antisense strand of a template DNA to be used as a template and having a structure represented by formula (1), and a reverse primer being complementary to a part of a sequence of a sense strand of the template DNA and having a structure represented by formula (1);
 an amplification step of performing a plurality of cycles of polymerase chain reaction (PCR) by using the template DNA as a template to form a forward-side extended chain being the forward primer extended and a reverse-side extended chain being the reverse primer extended, and of annealing the forward-side extended chain and the reverse-side extended chain to form double-stranded DNA with 3'-recessed ends; and
 a deprotection step of deprotecting the $R_1$.

9. The method according to claim 8, wherein the primer has a sequence in which two or more structures each represented by the formula (1) are continuous.

* * * * *